(12) United States Patent
Krah et al.

(10) Patent No.: US 10,459,587 B2
(45) Date of Patent: *Oct. 29, 2019

(54) TOUCH SENSOR PANEL WITH MULTI-POWER DOMAIN CHIP CONFIGURATION

(71) Applicant: Apple Inc., Cupertino, CA (US)

(72) Inventors: Christoph H. Krah, Cupertino, CA (US); Christian M. Sauer, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/179,565

(22) Filed: Nov. 2, 2018

(65) Prior Publication Data

US 2019/0073061 A1    Mar. 7, 2019

Related U.S. Application Data

(63) Continuation of application No. 15/663,271, filed on Jul. 28, 2017, now Pat. No. 10,120,520.

(Continued)

(51) Int. Cl.
*G06F 3/044* (2006.01)
*G02F 1/1333* (2006.01)
(Continued)

(52) U.S. Cl.
CPC ............ *G06F 3/044* (2013.01); *G02F 1/1343* (2013.01); *G02F 1/13338* (2013.01); *G06F 3/0412* (2013.01); *G06F 3/0418* (2013.01)

(58) Field of Classification Search
CPC ...... G06F 3/0412; G06F 3/0418; G06F 3/044; G02F 1/13338; G02F 1/1343
See application file for complete search history.

(56) References Cited

U.S. PATENT DOCUMENTS 3,656,065 A    4/1972   Reinhard et al.
3,984,757 A    10/1976  Gott
(Continued)

FOREIGN PATENT DOCUMENTS

CN    1202254 A       12/1998
CN    2012-18943 Y    4/2009
(Continued)

OTHER PUBLICATIONS

French Search Report, dated Apr. 12, 2012, from corresponding FR Application No. 752313, two pages.

(Continued)

*Primary Examiner* — Muhammad N Edun
(74) *Attorney, Agent, or Firm* — Kubota & Basol LLP

(57) ABSTRACT

A touch sensing system is disclosed. The touch sensing system includes a guard signal generation chip operating in a first power domain referenced to a first voltage, the guard signal generation chip configured to generate a guard signal. A touch sensing chip operates in a second power domain, different from the first power domain, referenced to the guard signal, the touch sensing chip configured to sense touch at one or more touch electrodes included in a touch sensor panel operating in the second power domain referenced to the guard signal, and the touch sensing chip a different chip than the guard signal generation chip. A voltage regulator is configured to selectively regulate a voltage of the guard signal at the touch sensing chip.

19 Claims, 12 Drawing Sheets

Related U.S. Application Data

(60) Provisional application No. 62/458,925, filed on Feb. 14, 2017, provisional application No. 62/399,230, filed on Sep. 23, 2016, provisional application No. 62/368,798, filed on Jul. 29, 2016.

(51) Int. Cl.
*G02F 1/1343* (2006.01)
*G06F 3/041* (2006.01)

(56) References Cited

U.S. PATENT DOCUMENTS

| | | |
|---|---|---|
| 3,988,669 A | 10/1976 | Fasching |
| 4,149,231 A | 4/1979 | Bukosky |
| 5,041,817 A | 8/1991 | Reeb |
| 5,095,224 A | 3/1992 | Renger |
| 5,173,685 A | 12/1992 | Nimmo |
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,847,690 A | 12/1998 | Boie et al. |
| 5,880,411 A | 3/1999 | Gillespie et al. |
| 5,889,236 A | 3/1999 | Gillespie et al. |
| 5,914,465 A | 6/1999 | Allen et al. |
| 6,127,899 A | 10/2000 | Silva et al. |
| 6,188,391 B1 | 2/2001 | Seely et al. |
| 6,204,897 B1 | 3/2001 | Colgan et al. |
| 6,310,610 B1 | 10/2001 | Beaton et al. |
| 6,323,846 B1 | 11/2001 | Westerman et al. |
| 6,373,474 B1 | 4/2002 | Katabami |
| 6,429,700 B1 | 8/2002 | Yang |
| 6,587,358 B1 | 7/2003 | Yasumura |
| 6,690,387 B2 | 2/2004 | Zimmerman et al. |
| 6,847,354 B2 | 1/2005 | Vranish |
| 7,015,894 B2 | 3/2006 | Morohoshi |
| 7,151,417 B1 | 12/2006 | Suzuki |
| 7,184,064 B2 | 2/2007 | Zimmerman et al. |
| 7,211,966 B2 | 5/2007 | Green et al. |
| 7,288,945 B2 | 10/2007 | Martinez et al. |
| 7,525,348 B1 | 4/2009 | Ziazadeh |
| 7,589,596 B2 | 9/2009 | Masuda et al. |
| 7,663,607 B2 | 2/2010 | Hotelling et al. |
| 7,898,122 B2 | 3/2011 | Andrieux et al. |
| 7,961,055 B2 | 6/2011 | Miyata et al. |
| 7,986,194 B2 | 7/2011 | Kiyohara et al. |
| 8,149,002 B2 | 4/2012 | Ossart et al. |
| 8,222,885 B2 | 7/2012 | Kirchmeier et al. |
| 8,355,887 B1 | 1/2013 | Harding et al. |
| 8,436,687 B2 | 5/2013 | Aruga et al. |
| 8,479,122 B2 | 7/2013 | Hotelling et al. |
| 8,665,237 B2 | 3/2014 | Koshiyama et al. |
| 8,766,950 B1 | 7/2014 | Morein et al. |
| 8,773,351 B2 | 7/2014 | Rekimoto |
| 8,917,256 B2 | 12/2014 | Roziere |
| 8,933,710 B2 | 1/2015 | Blondin et al. |
| 8,963,372 B2 | 2/2015 | Takano et al. |
| 9,000,782 B2 | 4/2015 | Roziere |
| 9,151,791 B2 | 10/2015 | Roziere |
| 9,151,792 B1 | 10/2015 | Kremin et al. |
| 9,250,757 B2 | 2/2016 | Roziere |
| 9,401,697 B2 | 7/2016 | Blondin et al. |
| 9,442,330 B2 | 9/2016 | Huo |
| 9,535,547 B2 | 1/2017 | Roziere |
| 9,640,991 B2 | 5/2017 | Blondin et al. |
| 10,007,388 B2 | 6/2018 | Roziere |
| 2002/0015024 A1 | 2/2002 | Westerman et al. |
| 2003/0075427 A1 | 4/2003 | Caldwell |
| 2004/0125918 A1 | 7/2004 | Shanmugavel et al. |
| 2004/0243747 A1 | 12/2004 | Rekimoto |
| 2005/0030683 A1 | 2/2005 | Tailliet |
| 2005/0146377 A1 | 7/2005 | Owen |
| 2005/0219228 A1 | 10/2005 | Alameh et al. |
| 2006/0161871 A1 | 7/2006 | Hotelling et al. |
| 2006/0197753 A1 | 9/2006 | Hotelling |
| 2008/0012835 A1 | 1/2008 | Rimon et al. |
| 2008/0042985 A1 | 2/2008 | Katsuhito et al. |
| 2008/0062148 A1 | 3/2008 | Hotelling et al. |
| 2008/0180365 A1 | 7/2008 | Ozaki |
| 2008/0231292 A1 | 9/2008 | Ossart |
| 2008/0246496 A1 | 10/2008 | Hristov et al. |
| 2008/0246511 A1 | 10/2008 | Miura |
| 2009/0009485 A1 | 1/2009 | Bytheway |
| 2009/0027937 A1 | 1/2009 | Kirchmeier |
| 2009/0091546 A1 | 4/2009 | Joo et al. |
| 2009/0109192 A1 | 4/2009 | Liu |
| 2009/0141046 A1 | 6/2009 | Rathnam et al. |
| 2009/0179868 A1 | 7/2009 | Ayres et al. |
| 2009/0212642 A1 | 8/2009 | Krah |
| 2009/0309851 A1 | 12/2009 | Bernstein |
| 2010/0004029 A1 | 1/2010 | Kim |
| 2010/0019779 A1 | 1/2010 | Kato et al. |
| 2010/0031174 A1 | 2/2010 | Kim |
| 2010/0066686 A1 | 3/2010 | Joguet et al. |
| 2010/0090964 A1 | 4/2010 | Soo et al. |
| 2010/0097346 A1 | 4/2010 | Sleeman |
| 2010/0123667 A1 | 5/2010 | Kim et al. |
| 2010/0135051 A1 | 6/2010 | Mallwitz |
| 2010/0139991 A1 | 6/2010 | Philipp et al. |
| 2010/0149127 A1 | 6/2010 | Fisher et al. |
| 2010/0182018 A1 | 7/2010 | Hazelden |
| 2010/0201635 A1 | 8/2010 | Klinghult et al. |
| 2010/0277418 A1 | 11/2010 | Huang |
| 2010/0328262 A1 | 12/2010 | Huang et al. |
| 2011/0001491 A1 | 1/2011 | Huang et al. |
| 2011/0007021 A1 | 1/2011 | Bernstein et al. |
| 2011/0007030 A1 | 1/2011 | Mo et al. |
| 2011/0050256 A1 | 3/2011 | Frangen |
| 2011/0061949 A1 | 3/2011 | Krah et al. |
| 2011/0080391 A1 | 4/2011 | Brown et al. |
| 2011/0133788 A1 | 6/2011 | Liu |
| 2011/0193848 A1 | 8/2011 | Kojima |
| 2012/0182251 A1 | 7/2012 | Krah |
| 2012/0187965 A1 | 7/2012 | Roziere |
| 2012/0262410 A1 | 10/2012 | Lim |
| 2012/0287068 A1 | 11/2012 | Colgate |
| 2013/0285971 A1 | 10/2013 | Eltas et al. |
| 2013/0323942 A1 | 12/2013 | Blondin |
| 2014/0070823 A1 | 3/2014 | Roziere |
| 2014/0103712 A1 | 4/2014 | Blondin |
| 2014/0125357 A1 | 5/2014 | Blondin |
| 2014/0132534 A1 | 5/2014 | Kim |
| 2014/0267165 A1 | 9/2014 | Roziere |
| 2015/0035787 A1 | 2/2015 | Shahparnia et al. |
| 2016/0034102 A1 | 2/2016 | Roziere et al. |
| 2016/0117017 A1 | 4/2016 | Kremin et al. |
| 2016/0170533 A1 | 6/2016 | Roziere |
| 2017/0003779 A1 | 1/2017 | Reynolds |
| 2017/0068352 A1 | 3/2017 | Blondin et al. |
| 2017/0075495 A1 | 3/2017 | Roberson et al. |
| 2017/0108968 A1 | 4/2017 | Roziere |
| 2017/0108978 A1 | 4/2017 | Blondin et al. |
| 2017/0220156 A1 | 8/2017 | Blondin |
| 2017/0262121 A1 | 9/2017 | Kurasawa |
| 2017/0315646 A1 | 11/2017 | Roziere |
| 2018/0074633 A1 | 3/2018 | Kida |
| 2018/0107309 A1 | 4/2018 | Endo |

FOREIGN PATENT DOCUMENTS

| | | |
|---|---|---|
| DE | 11-2012 0049 | 8/2014 |
| EP | 2 131 202 A1 | 9/2009 |
| EP | 2 144 146 A1 | 1/2010 |
| EP | 2 148 264 A2 | 1/2010 |
| EP | 2 224 277 A1 | 9/2010 |
| FR | 2 693 555 A1 | 1/1994 |
| FR | 2 756 048 A1 | 5/1998 |
| FR | 2 893 711 A1 | 5/2007 |
| FR | 2 896 595 | 7/2007 |
| FR | 2 949 008 | 2/2011 |
| FR | 3 004 551 | 10/2014 |
| JP | H-04-015516 A | 1/1992 |
| JP | 9-280806 A | 10/1997 |

(56) References Cited

FOREIGN PATENT DOCUMENTS

| | | |
|---|---|---|
| JP | 11-304942 A | 11/1999 |
| JP | 2000-132319 A | 5/2000 |
| JP | 2000-163031 A | 6/2000 |
| JP | 2002-342033 A | 11/2002 |
| JP | 2004-526265 A | 8/2004 |
| JP | 2006-251927 A | 9/2006 |
| JP | 2008-117371 A | 5/2008 |
| JP | 2009-086240 A | 4/2009 |
| JP | 2009-157373 A | 7/2009 |
| JP | 2011-053212 A | 3/2011 |
| KR | 10-2007-0042178 A | 4/2007 |
| KR | 10-2008-0041278 A | 5/2008 |
| KR | 10-2011-0044670 A | 4/2011 |
| WO | WO-2006/126703 A2 | 11/2006 |
| WO | WO-2007/060324 A1 | 5/2007 |
| WO | WO-2007/146780 A2 | 12/2007 |
| WO | WO-2008/000964 A1 | 1/2008 |
| WO | WO-2008/030780 A1 | 3/2008 |
| WO | WO-2011/015795 A2 | 2/2011 |
| WO | WO-2011/015795 A3 | 2/2011 |
| WO | WO-2012/172240 A1 | 12/2012 |
| WO | WO-2012/172241 A1 | 12/2012 |
| WO | WO-2013/093327 | 6/2013 |
| WO | WO-2016/066282 A1 | 5/2016 |
| WO | WO-2018/023089 A1 | 2/2018 |

OTHER PUBLICATIONS

International Search Report dated Aug. 21, 2012, for PCT Application No. PCT/FR2012/051289, three pages.

International Search Report dated Oct. 27, 2017, for PCT Application No. PCT/US2017/044545, six pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Notice of Allowance dated Jul. 5, 2018, for U.S. Appl. No. 15/663,271, filed Jul. 28, 2017, ten pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

International Search Report dated Jan. 11, 2019, for PCT Application No. PCT/US2018/051588, five pages.

International Search Report dated Jan. 7, 2019, for PCT Application No. PCT/US2018/051587, five pages.

TOUCH SENSOR PANEL WITH MULTI-POWER DOMAIN CHIP CONFIGURATION

CROSS-REFERENCE TO RELATED APPLICATIONS

This application is a continuation of U.S. patent application Ser. No. 15/663,271, filed Jul. 28, 2017 and published on Feb. 1, 2018 as U.S. Patent Publication No. 2018-0032176, which claims the benefit of U.S. Provisional Patent Application No. 62/458,925, filed Feb. 14, 2017, and U.S. Provisional Patent Application No. 62/399,230, filed Sep. 23, 2016, and U.S. Provisional Patent Application No. 62/368,798, filed Jul. 29, 2016, the contents of which are incorporated herein by reference in their entirety for all purposes.

FIELD OF THE DISCLOSURE

This relates generally to touch sensor panels, and more particularly to touch sensor panels in which a touch sensing chip operates in a different power domain than other chips in the touch sensing system.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent or non-transparent conductive plates (e.g., touch electrodes) made of materials such as Indium Tin Oxide (ITO). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

In some cases, parasitic or stray capacitances can exist between the touch electrodes used for sensing touch on the touch sensor panels, and other components of the devices in which the touch sensor panels are included, which can be referenced to a chassis or earth ground. These parasitic or stray capacitances can introduce errors and/or offsets into the touch outputs of the touch sensor panels, and can therefore degrade touch sensing dynamic range. Therefore, it can be beneficial to reduce or eliminate such parasitic or stray capacitances.

SUMMARY OF THE DISCLOSURE

As previously mentioned, parasitic or stray capacitances can exist between touch electrodes on touch sensor panels and other components of the devices in which the touch sensor panels are included, which can introduce errors and/or offsets into the touch outputs of the touch sensor panels, therefore degrading touch sensing dynamic range. The examples of the disclosure provide various touch sensing system configurations in which a touch sensing chip can be operated in a different power domain than other chips in the touch sensing system (i.e., the touch sensing chip can be referenced to a guard ground that can be different from a chassis or earth ground to which the other chips in the system can be referenced). Doing so can reduce or eliminate stray or parasitic capacitances that can exist between the touch electrodes and chassis or earth ground. This, in turn, can improve the touch sensing performance of the system.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent or non-transparent conductive plates (e.g., touch electrodes) made of materials such as Indium Tin Oxide (ITO), and some touch screens can be formed by at least partially integrating touch sensing circuitry into a display pixel stackup (i.e., the stacked material layers forming the display pixels). In some cases, parasitic or stray capacitances can exist between the touch electrodes used for sensing touch on the touch sensor panels, and other components of the devices in which the touch sensor panels are included, which can be referenced to a chassis or earth ground. These parasitic or stray capacitances can introduce errors and/or offsets into the touch outputs of the touch sensor panels, therefore degrading touch sensing dynamic range. Therefore, it can be beneficial to reduce or eliminate such parasitic or stray capacitances. The examples of the disclosure provide various touch sensing system configurations in which a touch sensing chip can be operated in a different power domain than other chips in the touch sensing system (i.e., the touch sensing chip can be referenced to a guard ground that can be different from a chassis or earth ground to which the other chips in the system can be referenced). Doing so can reduce or eliminate stray or parasitic capacitances that can exist between the touch electrodes and chassis or earth ground. This, in turn, can improve the touch sensing performance of the system.

Figure 1A:
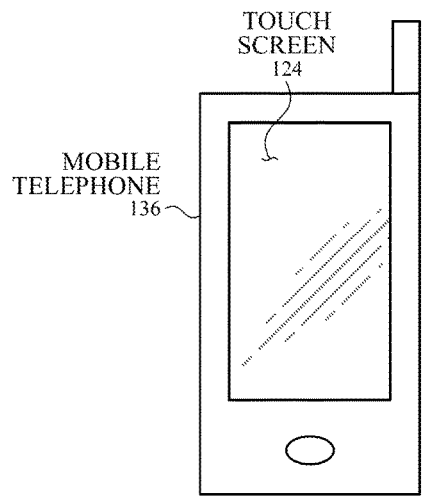
FIGS. 1A-1D illustrate an example mobile telephone, an example media player, an example personal computer and an example tablet computer that can each include an exemplary touch screen according to examples of the disclosure.
Figure 1B:
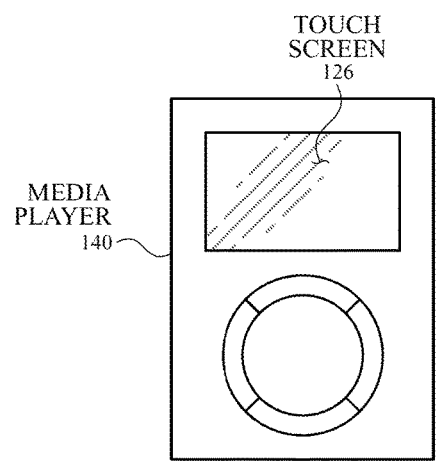
Figure 1C:
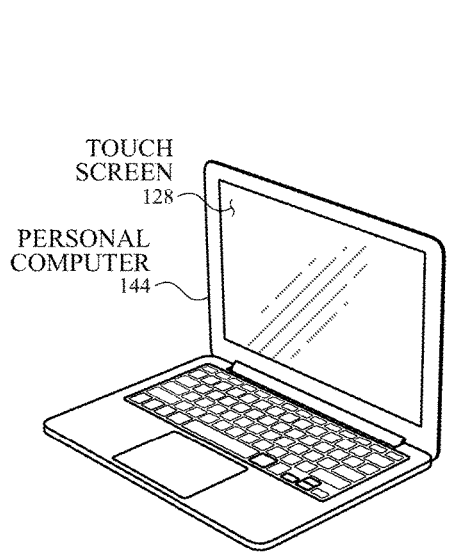
Figure 1D:
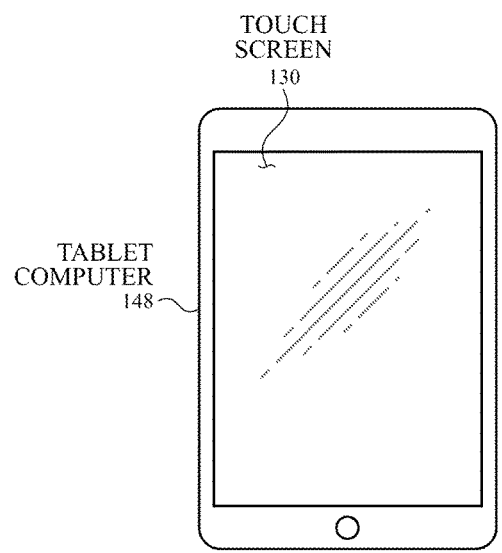

FIGS. 1A-1D illustrate example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices.

In some examples, touch screens 124, 126, 128 and 130 can be based on self-capacitance. A self-capacitance based touch system can include a matrix of small, individual plates of conductive material that can be referred to as touch node electrodes (as described below with reference to touch screen 220 in FIG. 2). For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change. This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128 and 130 can be based on mutual capacitance. A mutual capacitance based touch system can include drive and sense lines that may cross over each other on different layers, or may be adjacent to each other on the same layer. The crossing or adjacent locations can be referred to as touch nodes. During operation, the drive line can be stimulated with an AC waveform and the mutual capacitance of the touch node can be measured. As an object approaches the touch node, the mutual capacitance of the touch node can change. This change in the mutual capacitance of the touch node can be detected and measured by the touch sensing system to determine the positions of multiple objects when they touch, or come in proximity to, the touch screen.

Figure 2:
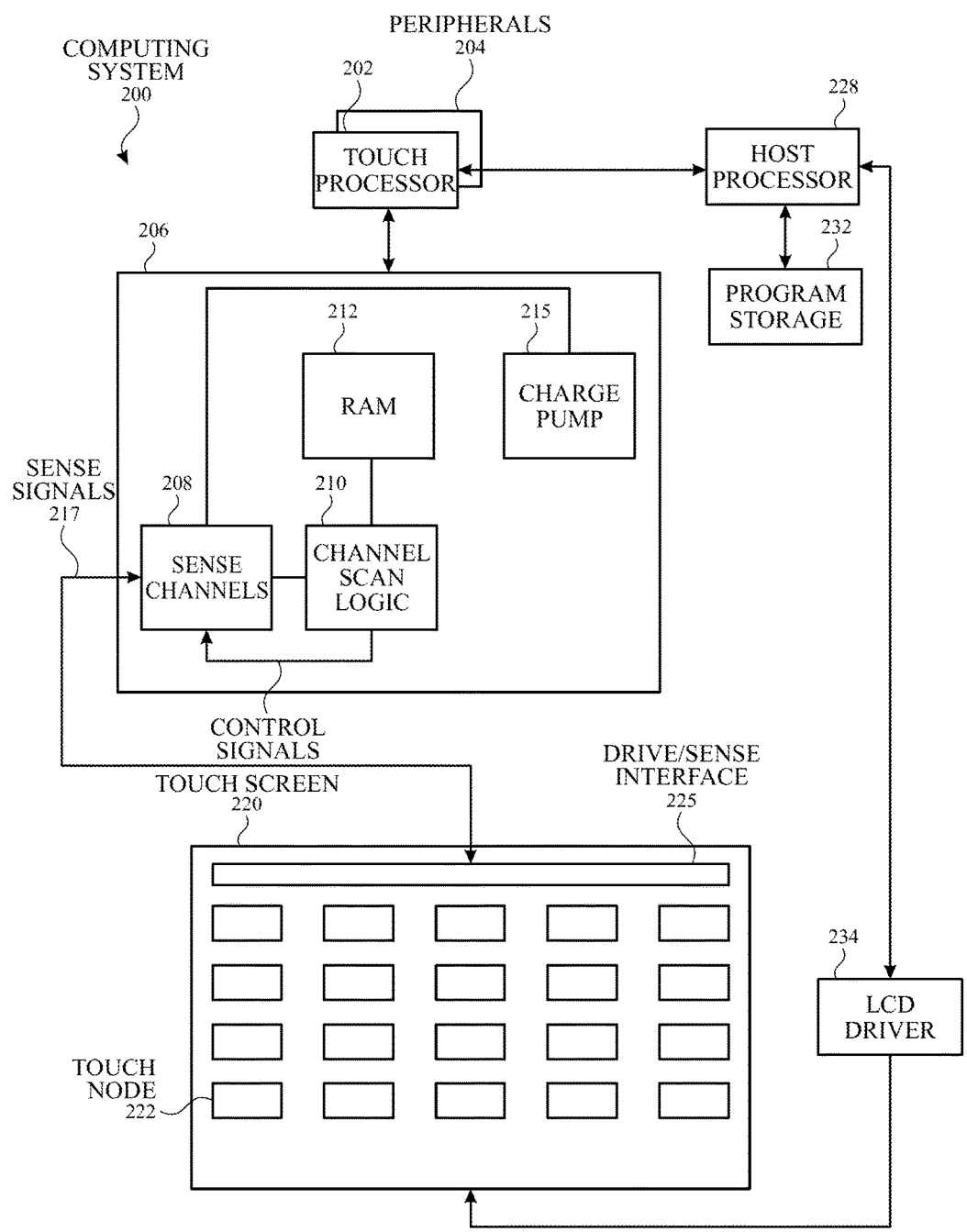
FIG. 2 is a block diagram of an example computing system that illustrates one implementation of an example self-capacitance touch screen according to examples of the disclosure.

FIG. 2 is a block diagram of an example computing system 200 that illustrates one implementation of an example self-capacitance touch screen 220 according to examples of the disclosure. It is understood that computing system 200 can instead include a mutual capacitance touch screen, as described above, though the examples of the disclosure will be described assuming a self-capacitance touch screen is provided. Computing system 200 can be included in, for example, mobile telephone 136, digital media player 140, personal computer 144, tablet computer 148, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In some examples, RAM 212 can contain various configuration information for specific touch screen 220 scans performed by channel scan logic 210 (e.g., scan specific configuration information for sense channels 208), can receive and/or store touch data from sense channels 208, and can be managed by channel scan logic 210. In addition, channel scan logic 210 can control sense channels 208 to generate stimulation signals at various frequencies and phases that can be selectively applied to the touch nodes of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of electrically isolated touch node electrodes 222 (e.g., a pixelated self-capacitance touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. In some examples, drive/sense interface 225 can be implemented in the touch controller 206, or can be implemented in a chip separate from touch controller 206. Additional exemplary details of how drive/sense interface 225 can be implemented can be found in U.S. patent application Ser. No. 15/009,774, filed Jan. 28, 2016, entitled "Flexible Self Capacitance and Mutual Capacitance Touch Sensing System Architecture," the entire contents of which is hereby incorporated by reference for all purposes. Labeling the conductive plates used to detect touch (i.e., touch node electrodes 222) as "touch node" electrodes can be particularly useful when touch screen 220 is viewed as capturing an "image" of touch (e.g., a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (e.g., gate) lines to each pixel transistor and can provide data signals along data lines to these same transistors to control the pixel display image as described in more detail below. Host processor 228 can use LCD driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing. It is understood that in some examples, touch screen 220 need not be integrated in a display module or stackup (e.g., need not be in-cell), but can instead be separate from the display module or stackup (e.g., a discrete touch sensor panel that is not part of a display, and is merely overlaid on the display or is separate from the display).

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
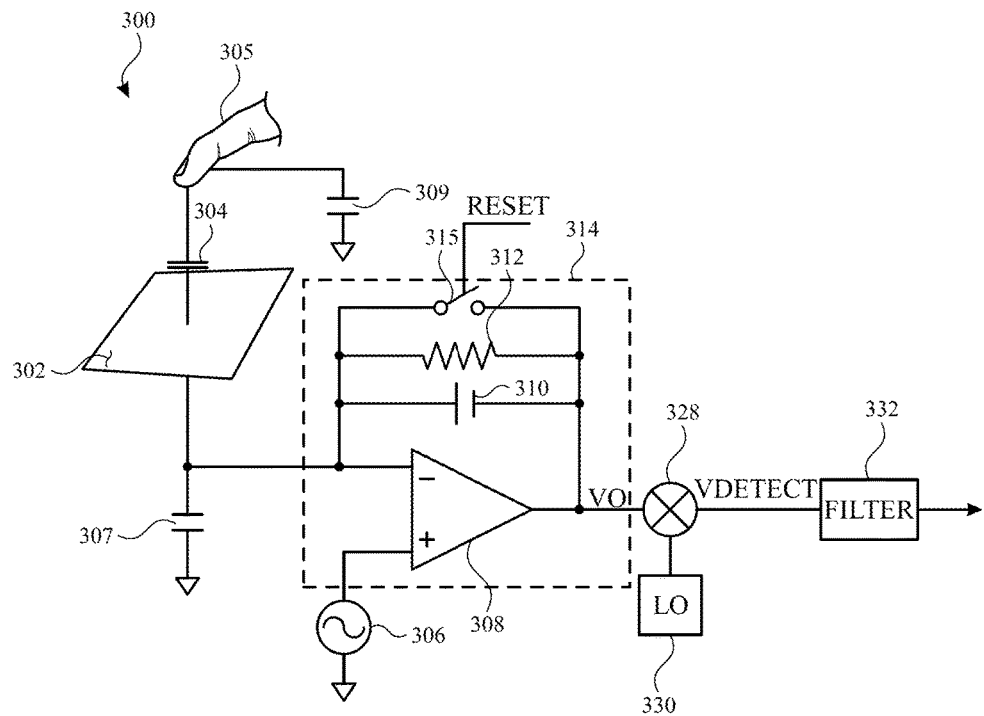
FIG. 3A illustrates an exemplary touch sensor circuit corresponding to a self-capacitance touch node electrode and sensing circuit according to examples of the disclosure.

FIG. 3A illustrates an exemplary touch sensor circuit 300 corresponding to a self-capacitance touch node electrode 302 and sensing circuit 314 according to examples of the disclosure. Touch node electrode 302 can correspond to touch node electrode 222. Touch node electrode 302 can have an inherent self-capacitance Cstray 307 to ground associated with it, and also an additional self-capacitance C 304 to ground that is formed when an object, such as finger 305, is in proximity to or touching the electrode. The total self-capacitance to ground of touch node electrode 302 can be illustrated as capacitance C 304+Cstray 307. Finger 305 can have capacitance Cbody 309 to ground. Note that Cbody 309 can typically be much larger than C 304 such that the total series capacitance of C 304 and Cstray 307 can be approximately C 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. In some examples, switch 315 can be coupled across feedback resistor 312 (e.g., in parallel with feedback resistor 312 and/or feedback capacitor 310), and switch 315 can be controlled by signal RESET (e.g., the RESET signal can control whether switch 315 is open or closed). By closing and opening switch 315, the touch sensing system of the disclosure can dynamically change the feedback impedance of sensing circuit 314, which can change its operational characteristics. Details about the operation of switch 315 and the RESET signal will be provided later.

Touch node electrode 302 can be coupled to the inverting input (−) of operational amplifier 308. An AC voltage source 306 (Vac) can be coupled to the non-inverting input (+) of operational amplifier 308. As such, touch sensor circuit 300 can be configured to sense changes in the total self-capacitance 304 of the touch node electrode 302 induced by a finger or object either touching or in proximity to the touch sensor panel. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred; for example, the DC portion of Vdetect can be used by a processor to determine the presence of a proximity or touch event, or the output can be inputted into a discrete logic network to determine the presence of a proximity or touch event. Note that while FIG. 3A indicates the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Figure 3B:
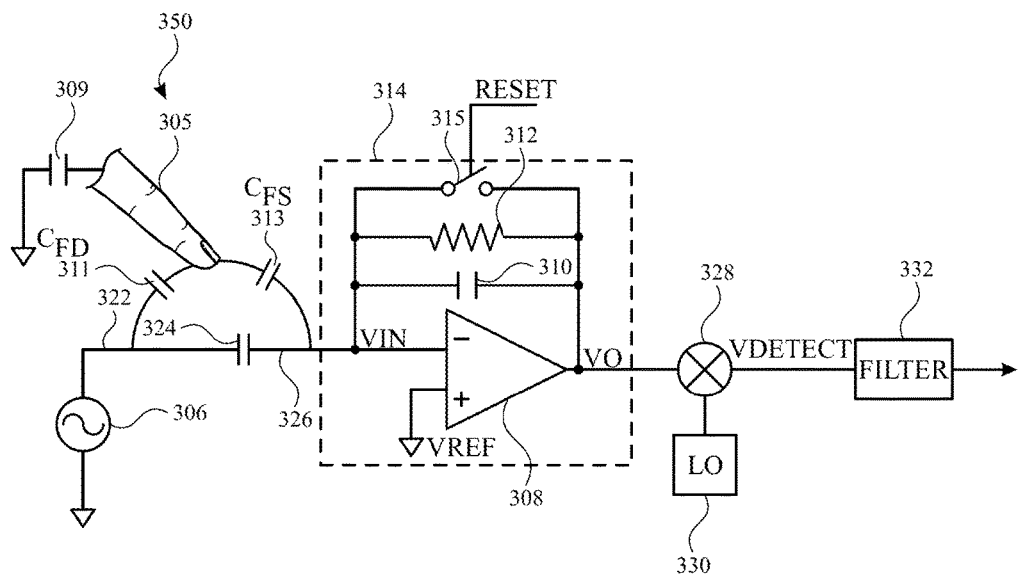
FIG. 3B illustrates an exemplary touch sensor circuit corresponding to a mutual-capacitance drive and sense line and sensing circuit according to examples of the disclosure.

FIG. 3B illustrates an exemplary touch sensor circuit 350 corresponding to a mutual-capacitance drive 322 and sense 326 line and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can be altered as indicated by capacitances $C_{FD}$ 311 and $C_{FS}$ 313, which can be formed between drive line 322, finger 305 and sense line 326. This change in mutual capacitance 324 can be detected to indicate a touch or proximity event at the touch node, as described previously and below. The sense signal coupled onto sense line 326 can be received by sensing circuit 314. Sensing circuit 314 can include operational amplifier 308 and at least one of a feedback resistor 312 and a feedback capacitor 310. In some examples, switch 315 can be coupled across feedback resistor 312 (e.g., in parallel with feedback resistor 312 and/or feedback capacitor 310), and switch 315 can be controlled by signal RESET (e.g., the RESET signal can control whether switch 315 is open or closed). By closing and opening switch 315, the touch sensing system of the disclosure can dynamically change the feedback impedance of sensing circuit 314, which can change its operational characteristics. Details about the operation of switch 315 and the RESET signal will be provided later.

FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref Operational amplifier 308 can drive its output to voltage Vo to keep Vin substantially equal to Vref, and can therefore maintain Vin constant or virtually grounded. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred. Note that while FIG. 3B indicates the demodulation at multiplier 328 occurs in the analog domain, output Vo may be digitized by an ADC, and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays, such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
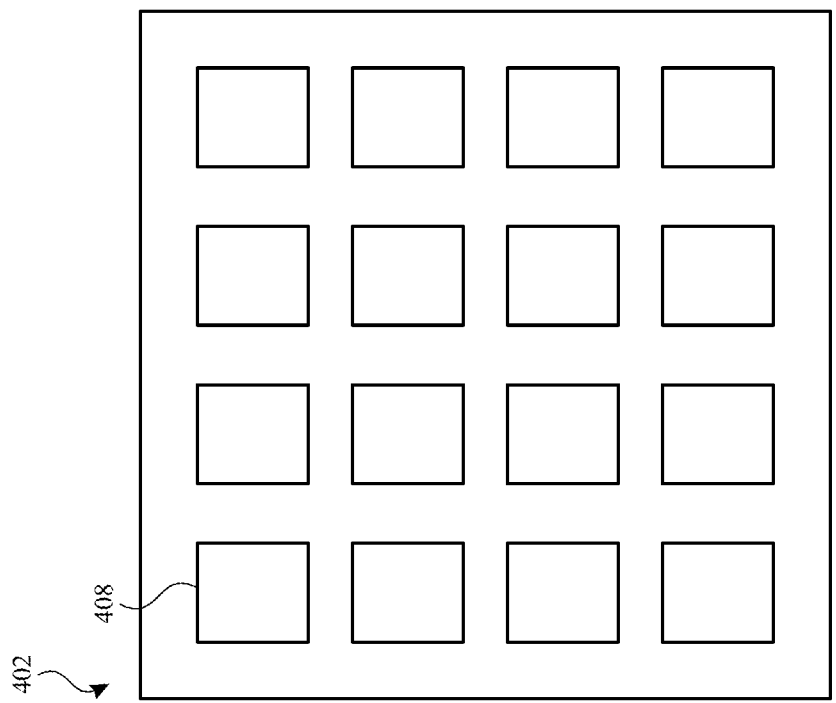
FIG. 4B illustrates a touch screen with touch node electrodes arranged in a pixelated touch node electrode configuration according to examples of the disclosure.
Figure 4A:
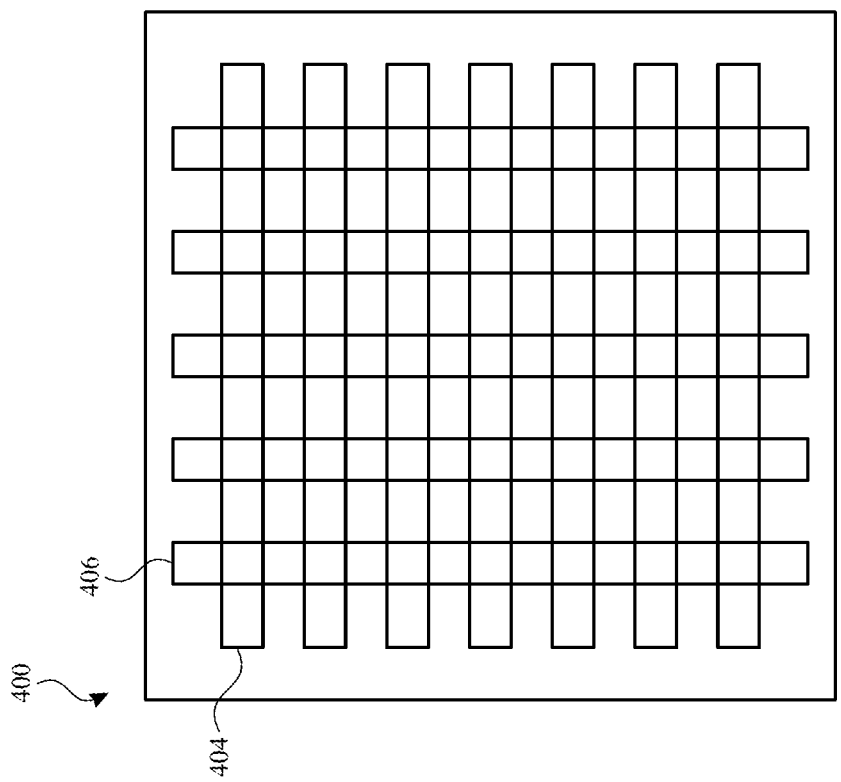
FIG. 4A illustrates a touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other while remaining electrically isolated from each other, as illustrated in FIG. 4A. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 400. In some examples, touch screen 400 can sense the self-capacitance of touch node electrodes 408 to detect touch and/or proximity activity on touch screen 400, and in some examples, touch screen 400 can sense the mutual capacitance between touch node electrodes 408 to detect touch and/or proximity activity on touch screen 400.

In some examples, the touch sensing circuitry of a touch screen or touch sensor panel (e.g., touch sensing circuitry as described with reference to FIGS. 2 and 3A-3B) can be fabricated in an electronic chip (e.g., an integrated circuit, etc.), and the electronic chip and/or the circuitry included in the electronic chip can operate with respect to a reference voltage provided by the chassis of the electronic device ("chassis ground") in which the touch screen or touch sensor panel is included (e.g., devices 136, 140, 144 and 148 in FIGS. 1A-1D). In some examples this chassis ground can be a grounding pathway from the chassis through a user operating the electronic device to earth ground. In some examples, this chassis ground can be the same as earth ground. However, in some examples, operating the electronic chip and/or the circuitry included in the electronic chip with respect to chassis or earth ground can result in undesirable touch sensing performance, as will be described in more detail below.

Figure 5A:
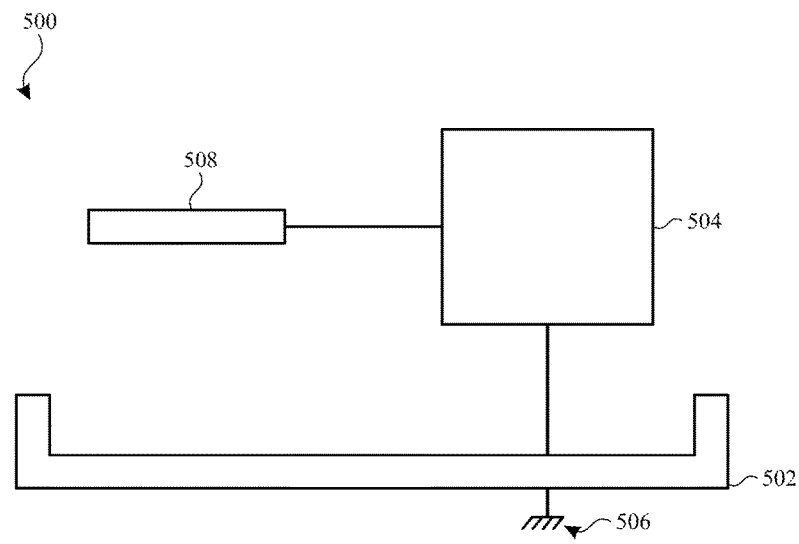
FIGS. 5A-5B illustrate an exemplary touch sensor panel configuration in which the touch sensing circuitry of the touch sensor panel is included in an electronic chip (e.g., an integrated circuit, etc.) that is referenced to earth or chassis ground according to examples of the disclosure.
Figure 5B:
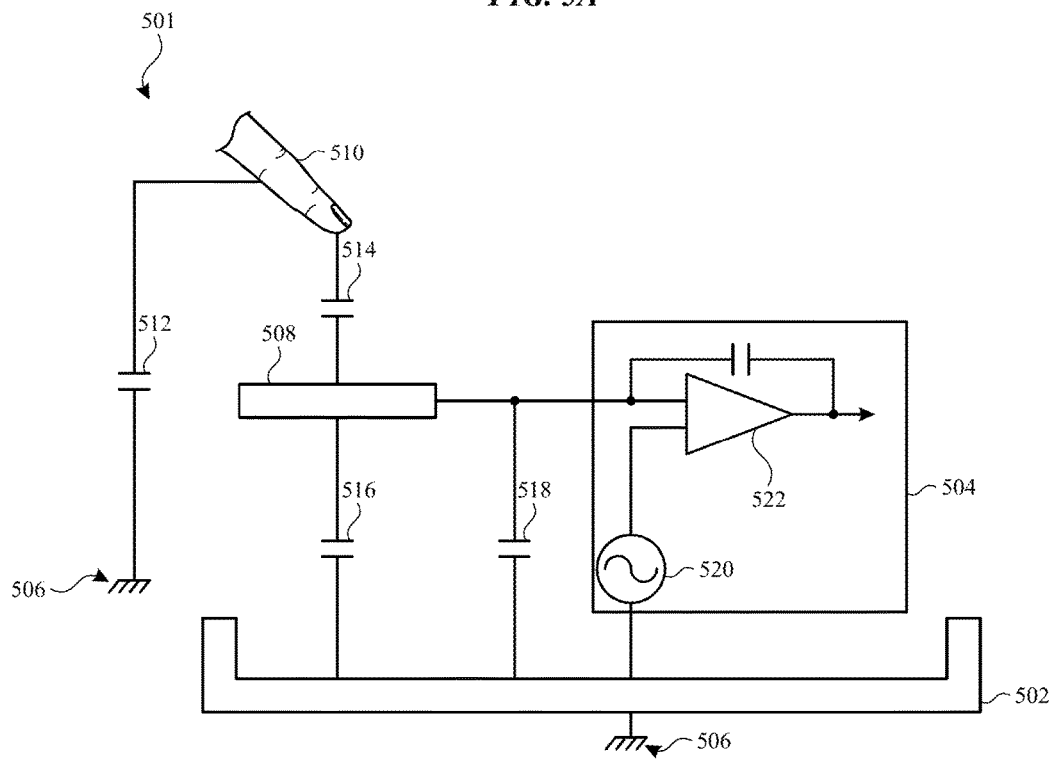

FIGS. 5A-5B illustrate an exemplary touch sensor panel configuration 500 in which the touch sensing circuitry of the touch sensor panel is included in an electronic chip (e.g., an integrated circuit, etc.) that is referenced to earth or chassis ground according to examples of the disclosure. Specifically, in configuration 500 of FIG. 5A, a touch sensor panel is included in a device (e.g., devices 136, 140, 144 and 148 in FIGS. 1A-1D) having device chassis 502. Chassis 502 can be grounded to earth ground 506 (e.g., via a user holding the device or otherwise in contact with the device), or can be grounded to a separate device ground (not illustrated). Chassis 502 can include electronic chip 504, which can include touch sensing circuitry for sensing touch on the touch sensor panel included in the device of FIG. 5A. For example, chip 504 can include touch controller 206, drive/sense interface 225 and/or touch processor 202 of FIG. 2 and/or the touch sensing circuits of FIGS. 3A-3B. Chip 504 and/or the touch sensing circuitry in chip 504 can be referenced to chassis 502 (e.g., referenced to earth ground 506). Chip 504 can be coupled, via one or more traces, to touch node electrode 508, which can be a touch node electrode included in the touch sensor panel of the device of FIG. 5A. Chip 504 can also be coupled to other touch node electrodes included in the touch sensor panel, though a single touch node electrode 508 is illustrated for ease of description. Chip 504 can measure the self-capacitance of touch node electrode 508 to detect proximity activity at touch node electrode 508, as discussed with reference to FIG. 3A.

FIG. 5B illustrates various capacitances associated with proximity detection using touch sensor panel configuration 500 of FIG. 5A according to examples of the disclosure. Specifically, finger (or object) 510 can be in proximity to touch node electrode 508. Finger 510 can be grounded to earth ground 506 through capacitance 512 (e.g., $C_{body}$), which can represent a capacitance from finger 510 through a user's body to earth ground 506. Capacitance 514 (e.g., $C_{touch}$) can represent a capacitance between finger 510 and touch node electrode 508, and can be the capacitance of interest in determining how close finger 510 is to touch node electrode 508. Capacitance 514 can be measured by sense circuitry 522 (e.g., as described with reference to FIG. 3A) included in chip 504 to determine an amount of touch at touch node electrode 508. However, because touch node electrode 508 can be in proximity to chassis 502 (e.g., due to being included in the device of which chassis 502 is a part), which can be grounded to earth ground 506, parasitic or stray capacitances can exist between touch node electrode 508 and chassis 502 (represented by capacitance 516 (e.g., $C_p$)) and/or between traces that connect touch node electrode 508 to sense circuitry 522 and chassis 502 (represented by capacitance 518 (e.g., $C_s$)). These stray capacitances 516 and 518 can also be measured by sense circuitry 522, and can create an offset (e.g., from zero output signal) in the output signal of sense circuitry 522, which can reduce the touch signal-to-noise ratio (or the touch dynamic range) of sense circuitry 522. This, in turn, can reduce the range of touch-related capacitances (e.g., $C_{touch}$ 514) that sense circuitry 522 can detect, thus potentially limiting the touch sensing performance of the touch sensor panel in which touch node electrode 508 is included.

In order to reduce or eliminate parasitic or stray capacitances that may be measured by sense circuitry in a touch sensing chip of a touch sensor panel, a guard plane can be established between the touch-related components of the touch sensor panel (e.g., touch node electrode 508, touch sensing chip 504, etc.) and one or more portions of chassis 502 (e.g., the surface of chassis 502 corresponding to a back plate of the device). The guard plane, including the touch sensing chip (e.g., integrated circuit, etc.), can be referenced to a guard potential that can mirror or be the same as the stimulation signal used to stimulate the touch node electrodes on the touch sensor panel. In this way, the voltages on both sides of the above-described parasitic or stray capacitances can mirror each other, causing those capacitances to fall out of the touch sensing measurements performed by the touch sensing circuitry in the touch sensing chip. Therefore, the signal portion (out of sense amplifier 522) associated with the undesired stray capacitances can be largely reduced, therefore improving the touch dynamic range and the touch sensing performance of the touch sensor panel. It should be understood that "guard plane" need not refer to a planar element or electrode; rather, the guard planes of the disclosure can be implemented in any number of manners, including being non-planar, being composed of one or more portions of the device that are driven/maintained at a guard potential, and being implemented in different ways in different parts of the device (e.g., as part of a flex circuit in one portion of the device, as part of the touch sensor panel in another portion of the device, etc.).

Figure 6A:
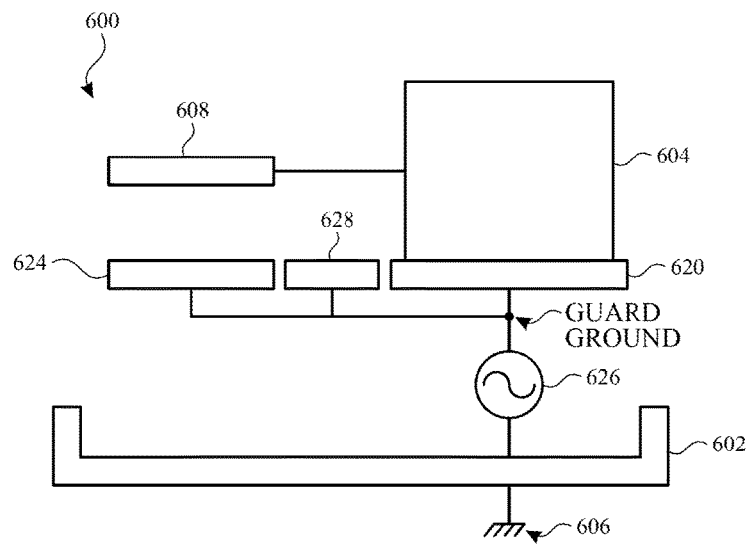
FIGS. 6A-6E illustrate an exemplary touch sensor panel configuration in which the touch sensing circuitry of the touch sensor panel is included on an electronic chip (e.g., an integrated circuit, etc.) that is referenced to a guard ground rather than a chassis or earth ground according to examples of the disclosure.
Figure 6B:
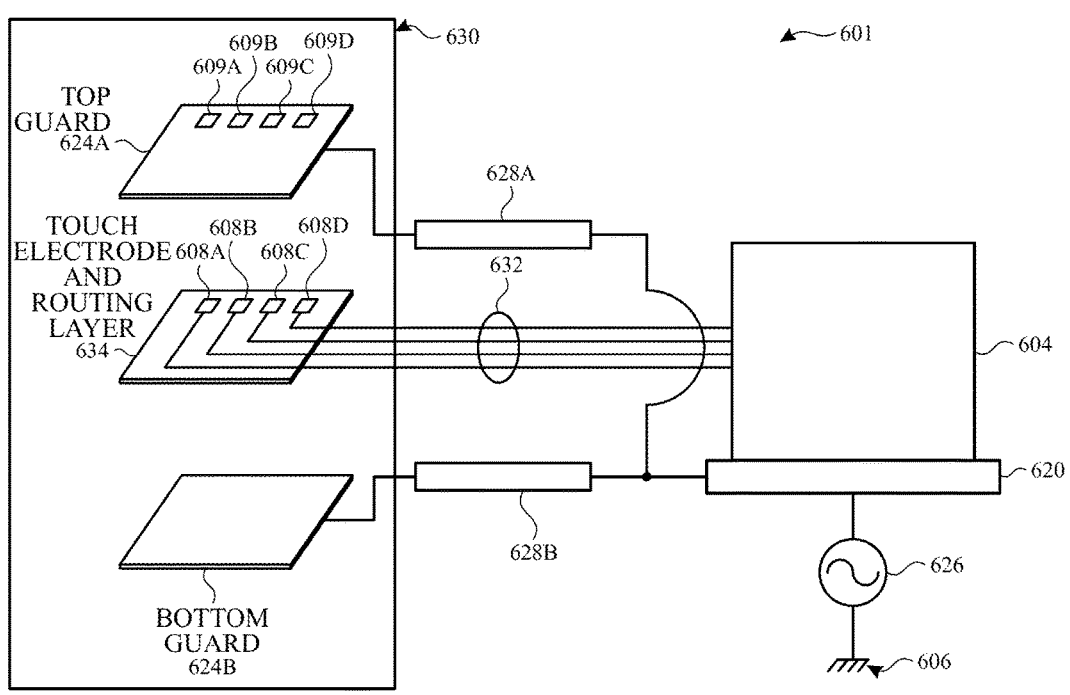
Figure 6C:
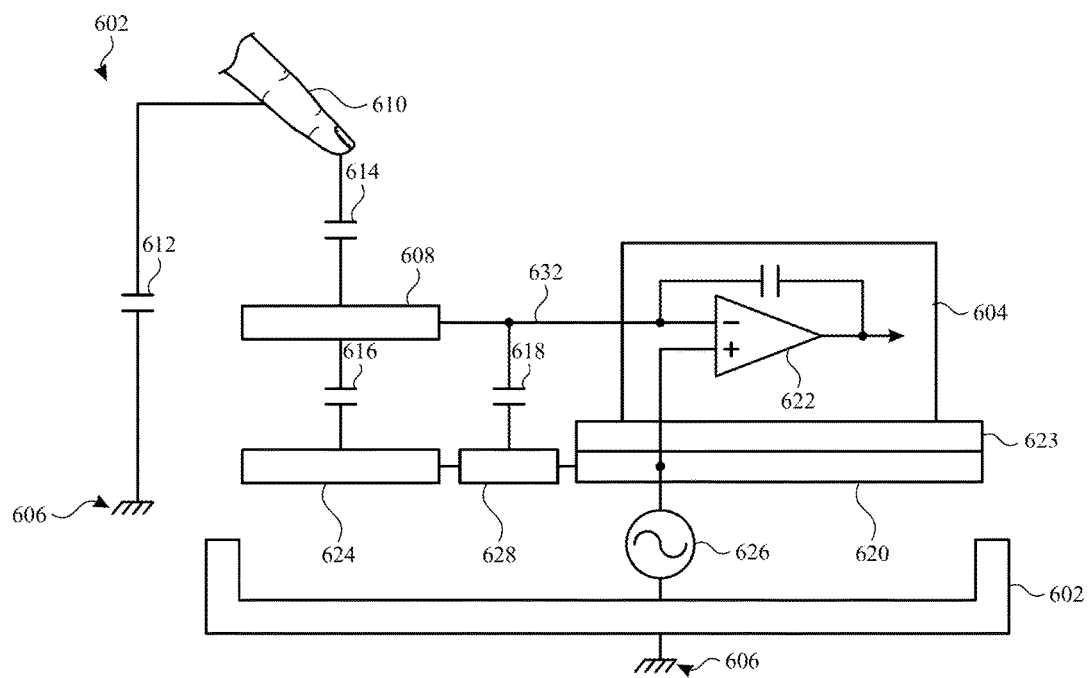

FIGS. 6A-6C illustrate an exemplary touch sensor panel configuration 600 in which the touch sensing circuitry of the touch sensor panel is included on an electronic chip (e.g., an integrated circuit, etc.) that is referenced to a guard ground rather than a chassis or earth ground according to examples of the disclosure. Specifically, in configuration 600 of FIG. 6A, touch sensing chip 604 (e.g., corresponding to touch sensing chip 504) is disposed or fabricated on guard plane 620, which can represent a virtual ground plane of touch sensing chip 604 that is different from chassis or earth ground 606. In particular, stimulation source 626 ("guard source") can be referenced to chassis or earth ground 606, and can output a guard voltage (e.g., a guard stimulation signal, such as a square wave) that can establish the voltage at guard plane 620. Stimulation source 626 can be included on a chip, separate from touch sensing chip 604. Because touch sensing chip 604 can be built on guard plane 620, the circuitry (e.g., touch sensing circuitry) included in touch sensing chip 604 can be referenced to the guard signal, and can be isolated from chassis or earth ground 606 by guard plane 620. In other words, touch sensing chip 604 and the chip in which guard source 626 is included can operate in different "power domains": touch sensing chip 604 can operate in the guard power domain, and guard source 626 can operate in the chassis or earth power domain.

Additionally, guard plane 624 can be disposed between touch node electrode 608 and chassis 602 (or, more generally, earth ground 606), and guard plane 628 can be disposed between traces that couple touch node electrode 608 to touch sensing chip 604 and chassis 602 (or, more generally, earth ground 606). Guard plane 624 and guard plane 628 can also be stimulated by the same guard voltage as is guard plane 620. These guard planes 624 and 628 can similarly isolate touch node electrode 608 and traces that couple touch node electrode 608 to touch sensing chip 604 from chassis or earth ground 606. One or more of guard planes 620, 624 and 628 can reduce or eliminate parasitic or stray capacitances that may exist between touch node electrode 608 and chassis or earth ground 606, as will be described below.

FIG. 6B illustrates an exemplary structural configuration 601 for implementing the guarding of FIG. 6A according to examples of the disclosure. Specifically, as previously described, guard source 626 can provide a guard stimulus voltage to guard plane 620, on which touch sensing chip 604 can be disposed or fabricated and to which touch sensing chip 604 can be referenced. Guard plane 620 can be any conductive material on which touch sensing chip 604 can be disposed or fabricated (e.g., silver, copper, gold, etc.). For example, touch sensing chip 604 may be assembled on a flex circuit or printed circuit board (PCB), and may be referenced to the flex circuit or PCB ground layer 620 driven by guard source 626. Guard source 626 can be fabricated in an electronic chip that is distinct and separate from touch sensing chip 604, and the electronic chip in which guard source 626 is fabricated can be referenced to chassis or earth ground 606. Touch sensing chip 604 (e.g., touch sensing circuitry in touch sensing chip 604) can be coupled to touch node electrodes 608A, 608B, 608C and 608D (and other touch node electrodes included in touch electrode and routing layer 634 of touch sensor panel 630, referred to collectively as 608) in touch sensor panel 630 via traces 632 included on a flex circuit that couples touch sensing chip 604 to touch sensor panel 630. The flex circuit can include top 628A and bottom 628B shields that sandwich traces 632 on two sides, and that can also be coupled to guard source 626. Finally, touch sensor panel 630 can also include top 624A and bottom 624B shields that sandwich touch node electrodes 608 on touch electrode and routing layer 634 on two sides, and that can also be coupled to guard source 626. In some examples, the material(s) out of which shields 628 are made in the flex circuit can be different than the material(s) out of which shields 624 are made in touch sensor panel 630. For example, shields 624 in touch sensor panel 630 can be made of the same material that touch node electrodes 608 are made of (e.g., ITO, or another substantially transparent conductor), and shields 628 in the flex circuit can be made of a different conductor, such as copper, aluminum, or other conductor that may or may not be transparent. Top shield 624A can include openings 609A (e.g., corresponding to touch node electrode 608A), 609B (e.g., corresponding to touch node electrode 608B), 609C (e.g., corresponding to touch node electrode 608C) and 609D (e.g., corresponding to touch node electrode 608D) that allow touch node electrodes 608A, 608B, 608C and 608D, respectively, to detect, from above, touch activity on touch sensor panel 630 while guarding the routing on touch electrode and routing layer 634 from stray capacitances that can form due to a touch or other stray capacitances. Accordingly, the touch signal path from touch sensor panel 630 to the flex circuit to the touch sensing chip 604 can be referenced to a guard potential provided by guard source 626, and can be isolated from chassis or earth ground 606.

Figure 6D:
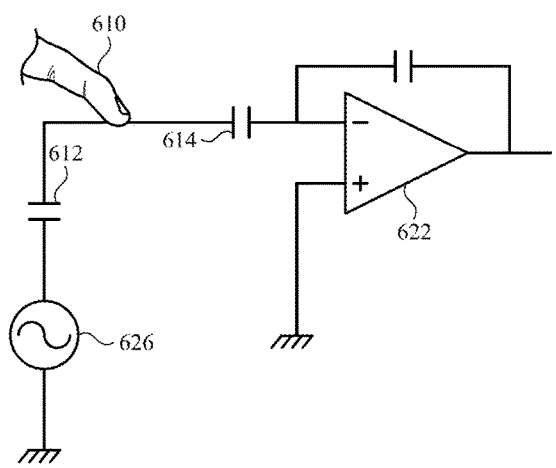

FIG. 6C illustrates various capacitances associated with proximity detection using touch sensor panel configuration 600 of FIG. 6A and/or touch sensor panel configuration 601 of FIG. 6B according to examples of the disclosure. Configuration 602 of FIG. 6C can be the same as configuration 501 of FIG. 5B, except as otherwise described below. Specifically, finger (or object) 610 can be in proximity to touch node electrode 608. Finger 610 can be grounded to earth ground 606 through capacitance 612 (e.g., $C_{body}$), which can represent a capacitance from finger 610 through a user's body to earth ground 606. Capacitance 614 (e.g., $C_{touch}$) can represent a capacitance between finger 610 and touch node electrode 608, and can be the capacitance of interest in determining how close finger 610 is to touch node electrode 608. Typically, $C_{body}$ 612 can be significantly larger than $C_{touch}$ 614 such that the equivalent series capacitance seen at touch node electrode 608 through finger 610 can be approximately $C_{touch}$ 614. Capacitance 616 can represent a capacitance between touch node electrode 608 and shield 624 (e.g., shields 624A and 624B in FIG. 6B), and capacitance 618 can represent a capacitance between trace(s) 632 and shield 628 (e.g., shields 628A and 628B in FIG. 6B). Touch sensing chip 604 can be mounted on (e.g., disposed or fabricated on) a printed circuit board 623, which can have a ground layer 620 to which the touch sensing chip 604 and the touch sensor panel can be referenced. In some examples, ground layer 620 can be included in printed circuit board 623 (e.g., as a conductive layer in the printed circuit board layers), or ground layer 620 can be a separate conductive plate on which printed circuit board 623 can be mounted. In the case that ground layer 620 is included in printed circuit board 623, the output of guard source 626 can be inputted directly into ground layer 620 within the printed circuit board 623. Guard plane 620 and shields 624 and 628 can be stimulated by guard source 626 at a guard voltage, as described with reference to FIGS. 6A-6B. Guard source 626 can also be used to drive touch node electrode 608 through touch sensing circuitry 622 (e.g., because the virtual ground and/or touch node electrode 608 coupled to the inverting input of sense amplifier 622 can follow the voltage reference for sense amplifier 622, which can be the guard voltage provided by guard source 626 coupled to the non-inverting input of sense amplifier 622) to detect touch at touch node electrode 608 (e.g., as described with reference to FIG. 3A), as shown in FIG. 6C. Because the voltage at touch node electrode 608 and trace(s) 632 can mirror or follow the voltage at shields 624 and 628, capacitances 616 and 618 can be reduced or eliminated from the touch measurements performed by touch sensing circuitry 622. As such, touch sensing circuitry 622 can simply detect $C_{touch}$ 614, which can appear as a virtual mutual capacitance between finger 610 and touch node electrode 608 as shown in FIG. 6D. Without stray capacitances 616 and 618 affecting the touch measurements performed by touch sensing circuitry 622, the offset in the output signal of sense circuitry 622 (e.g., when no touch is detected at touch node electrode 608) can be greatly reduced or eliminated, which can increase the signal to noise ratio and/or the dynamic range of sense circuitry 622. This, in turn, can improve the ability of touch sensing circuitry 622 to detect a greater range of touch at touch node electrode 608, and to accurately detect smaller capacitances $C_{touch}$ 614 (and, thus, to accurately detect hover activity at touch node electrode 608 at larger distances). Additionally, with a near-zero offset output signal from touch sensing circuitry 622, the effects of drift due to environmental changes (e.g., temperature changes) can be greatly reduced. For example, if the signal out of sense amplifier 622 consumes 50% of its dynamic range due to undesirable/un-guarded stray capacitances in the system, and the analog front end (AFE) gain changes by 10% due to temperature, the sense amplifier 622 output will drift by 5% and the effective signal-to-noise ratio (SNR) can be limited to 26 dB. By reducing the undesirable/un-guarded stray capacitances by 20 dB, the effective SNR can be improved from 26 dB to 46 dB.

Additionally, implementing touch sensing chip 604 as a separate chip than guard source 626, as described in this disclosure, can confer benefits in addition to those described above. Specifically, separating touch sensing chip 604 from guard source 626 can enable higher guard signal voltage levels (which can also be used to stimulate touch node electrode 608) that can be beyond what may be possible for a single chip implementation (e.g., an implementation in which touch sensing chip 604 and guard source 626 are included in a single chip).

FIG. 6D illustrates a diagram depicting the appearance of $C_{touch}$ 614 as a virtual mutual capacitance between finger 610 and touch node electrode 608, as described above, according to example of the disclosure. Specifically, because capacitances 616 and 618 in FIG. 6C can be reduced or eliminated from the touch measurements performed by touch sensing circuitry 622 due to the shielding provided by shields 624 and 628, $C_{touch}$ 614 can appear as a virtual mutual capacitance between finger 610 and touch node electrode 608, which can be coupled to the inverting input of sense circuitry 622. Specifically, finger 610 can appear to be stimulated via $C_{body}$ 612 by guard source 626, and finger 610 can have $C_{touch}$ 614 between it and the inverting input of sense circuitry 622. Changes in $C_{touch}$ 614 can, therefore, be sensed by sense circuitry 622 as changes in the virtual mutual capacitance $C_{touch}$ 614 between finger 610 and sense circuitry 622. As such, the offset in the output signal of sense circuitry 622 (e.g., when no touch is detected at touch node electrode 608) can be greatly reduced or eliminated, as described above. As a result, sense circuitry 622 (e.g., the input stage of sense circuitry 622) need not support as great a dynamic input range that self-capacitance sense circuitry (e.g., sense circuitry 314 in FIG. 3A) might otherwise need to support in circumstances/configurations that do not exhibit the virtual mutual capacitance effect described here.

Because the self-capacitance measurements of touch node electrodes in the touch screen configurations of this disclosure can exhibit the virtual mutual capacitance characteristics described above, in some examples, touch sensing chip 604 need not be a chip that supports self-capacitance measurements (e.g., touch sensing chip 604 may not include sense circuitry 314 as described in FIG. 3A). Instead, touch sensing chip 604 may be a standard mutual capacitance touch sensing chip that only supports mutual capacitance measurements (e.g., touch sensing chip 604 may include sense circuitry 314 as described in FIG. 3B, but not sense circuitry 314 as described in FIG. 3A). In such examples, guard source 626 can be appropriately designed and used with the mutual capacitance touch sensing chip in various configurations of this disclosure (e.g., configuration 600) to effectively achieve the guarded self-capacitance functionality of this disclosure despite touch sensing chip 604 being a mutual capacitance touch sensing chip, rather than a self-capacitance touch sensing chip. For example, referring to FIG. 3B, stimulation source 306 (e.g., guard source 626) can stimulate the guard plane(s) of the disclosure, which can act as the drive electrodes in the virtual mutual capacitance configuration described here. The touch node electrodes of the touch sensor panel can then, in turn, be treated as the sense electrodes in the virtual mutual capacitance configuration described here, and can be coupled to the input of sense amplifier 308 in FIG. 3B. Touch sensing circuitry 314 in FIG. 3B can then sense the mutual capacitance between the guard plane(s) and the touch node electrodes, which can be represented by the circuit configuration of FIG. 6D.

Figure 6E:
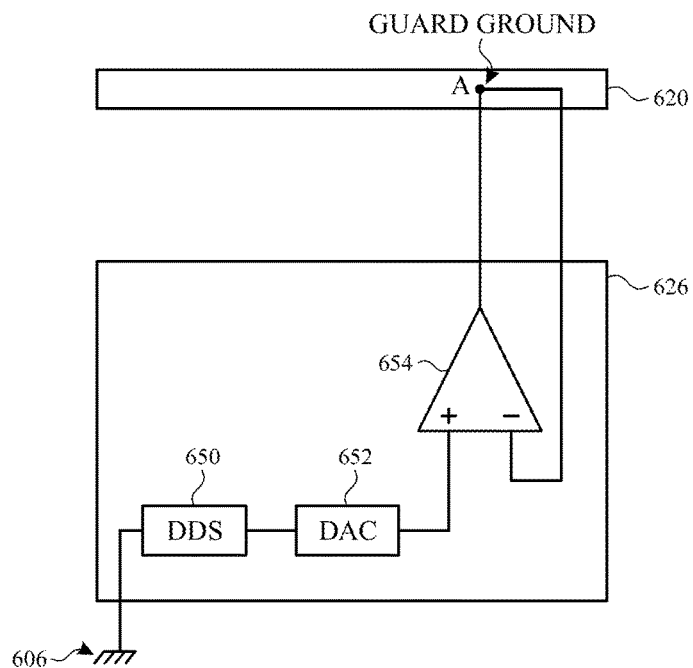

FIG. 6E illustrates an exemplary configuration for guard source 626 according to examples of the disclosure. Specifically, guard source 626 can include a direct digital synthesizer (DDS) 650 (e.g., a direct waveform synthesis generator) that can generate arbitrary waveforms, such as a square wave, and can be referenced to earth ground 606. The output of DDS 650 can be inputted to digital-to-analog converter (DAC) 652, which can convert the output of DDS 650 into a corresponding analog signal. The output of DAC 652 can be inputted to the non-inverting input of linear buffer 654 (e.g., a unity gain buffer, though it is understood that buffer 654 can alternatively have a non-unity gain configuration). The output of linear buffer 654 can correspond to the output of guard source 626, as previously described, and can provide a guard signal to guard plane 620. The inverting input of linear buffer 654 can be coupled to the output of linear buffer 654 to facilitate the feedback function of linear buffer 654. In some examples, the inverting input of linear buffer 654 can be coupled to the output of linear buffer 654 at a location that is remote from guard source 626; for example, as shown in FIG. 6E, the inverting input of linear buffer 654 can be coupled to node A at guard plane 620. In this way, the effect of resistance that might exist between the output of linear buffer 654 and node A at guard plane 620 can be reduced (e.g., because that resistance can be included in the feedback loop of linear buffer 654, which can, in turn, improve the accuracy of the voltage delivered by guard source 626 to guard plane 620).

It is understood that the example of FIG. 6E can illustrate a voltage mode DAC (e.g., DAC 652) and subsequent buffer (e.g., buffer 654). However, in some examples, DAC 652 can be a current mode DAC (iDAC) and buffer 654 can be a transimpedance amplifier (TIA) type buffer that can convert current from the iDAC to a buffer output voltage (e.g., similar to as described above with respect to FIG. 6E).

Because the guard signal provided to the touch sensing chip of the disclosure can be used as the stimulation signal for sensing touch on touch node electrodes on the touch sensor panel, it can be important for the guard signal to be known, stable and/or free of noise—noise in the guard signal can directly introduce errors into the measured value of touch at the touch node electrodes. Further, because the touch sensing chip can be separate from the guard source chip, resistances of bond pads, wires or other coupling circuitry/components between the touch sensing chip and the guard source chip can be substantial. Such substantial resistances can cause the guard signal that reaches the touch sensing chip to differ from the guard signal that is outputted by the guard source, as will be described with reference to FIGS. 7A-7B.

Figure 7A:
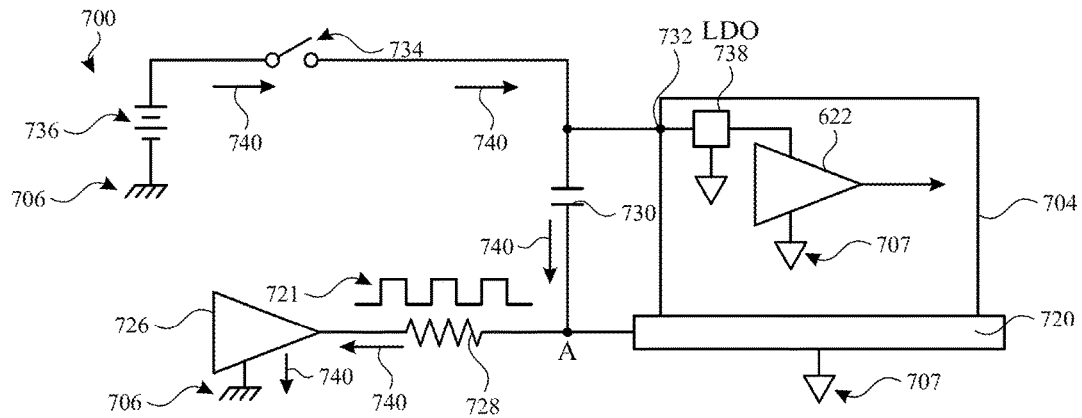
FIG. 7A illustrates an exemplary guard stimulus voltage delivery configuration for delivering a guard stimulus voltage to a touch sensing chip according to examples of the disclosure.

Specifically, FIG. 7A illustrates an exemplary guard stimulus voltage delivery configuration 700 for delivering a guard stimulus voltage to touch sensing chip 704 according to examples of the disclosure. Touch sensing chip 704 can be referenced to, disposed and/or fabricated on guard plane 720, as previously discussed. Guard ground 707 can represent the virtual ground provided by guard plane 720. Guard source 726 can be a buffer or other amplifier circuit whose output is coupled to guard plane 720, and that outputs guard signal 721. Guard source 726 can be included in a chip that is referenced to chassis or earth ground 706, and can be coupled to guard plane 720 via one or more of bond pads, wires, traces, etc.

Circuitry in touch sensing chip 704, such as touch sensing circuitry 622 as previously described (e.g., amplifier 308, multiplier 328, filter 332, etc.), can require two voltage rails to operate—a low voltage rail (e.g., provided by guard plane 720 stimulated by guard signal 721), and a high voltage rail (e.g., a voltage rail with a higher, or more positive, voltage than guard plane 720). As mentioned above, the voltage for the low voltage rail can be provided to touch sensing chip 704 by guard source 726, which can stimulate guard plane 720 with guard signal 721. In order to provide the high voltage rail to touch sensing chip 704, capacitor 730 can be coupled between guard plane 720 and high voltage input 732 of touch sensing chip 704. Capacitor 730 can be charged until a specified direct current (DC) voltage is built-up across capacitor 730, which can provide the high voltage (referenced to guard signal 721 on guard plane 720) to touch sensing chip 704. For example, one terminal of capacitor 730 can be coupled to guard plane 720 at node A, while the other terminal of capacitor 730 can be coupled to switch 734, which can be coupled to DC voltage source 736 that is referenced to chassis or earth ground 706. While guard signal 721 outputted by guard source 726 is low (e.g., substantially the voltage at chassis or earth ground 706, such as 0V), switch 734 can be closed (e.g., the device can be configured to close switch 734 via a control signal when guard signal 721 is low, or switch 734 can be configured to close itself when guard signal 721 is low), and DC voltage source 736 can charge capacitor 730 to the desired DC voltage offset between the low voltage rail (e.g., guard plane 720) and the high voltage rail of touch sensing chip 704. For example, this DC voltage offset can be on the order of 3V or 4V, though other voltages are also within the scope of the disclosure. In some examples, capacitor 730 can be charged in excess of the desired DC voltage offset between the low and high voltage rails of touch sensing chip 704, and the excess DC voltage on capacitor 730 can be regulated to the final desired voltage for the high voltage rail by voltage regulator 738 (e.g., a low-dropout or LDO regulator) in touch sensing chip 704 to be used by circuitry in the touch sensing chip (e.g., touch sensing circuitry 622).

While guard signal 721 outputted by guard source 726 is high (e.g., a voltage greater, or more positive, than chassis or earth ground 706, such as 2V, 3V, 4V, etc.), switch 734 can be open (e.g., the device can be configured to open switch 734 via a control signal when guard signal 721 is high, or switch 734 can be configured to open itself when guard signal 721 is high). In other words, when guard signal 721 transitions from low to high, switch 734 can open, and when guard signal 721 transitions from high to low, switch 734 can close. While switch 734 is open, capacitor 730 can provide its voltage to high voltage input 732, which can be regulated by voltage regulator 738 to the final desired voltage for the high voltage rail in touch sensing chip 704. In this way, voltage that is appropriately offset from guard signal 721 can be provided for the high voltage rail of touch sensing chip 704 during the various states of guard signal 721. Because voltage regulator 738 can be referenced to ground 707, which can be referenced to the guard signal, the operation of voltage regulator 738 need not be changed as the guard signal transitions between low and high—the voltage rails of voltage regulator 738 (e.g., ground 707 and the high voltage rail of touch sensing chip 704) can maintain their predetermined relationship, and voltage regulator 738 can operate without regard for the voltage transitions in the guard signal. In some examples, switch 734 can be current-limited or otherwise regulated to reduce or minimize inrush current into capacitor 730 (e.g., limited to only allow current below a current threshold), and/or reduce or minimize load current variations from voltage source 736. The low and high voltage rails of touch sensing chip 704 can have a predetermined relationship with respect to the "ground" 707 of touch sensing chip 704 (e.g., provided by guard source 626). Thus, as the voltage outputted by guard source 626 alternates (e.g., between a low voltage and a high voltage), the voltages on the low and high voltage rails of touch sensing chip 704 can similarly alternate such that the predetermined relationship of those voltages with respect to ground 707 can be maintained.

In some examples, voltage source 736, switch 734, and guard source 726 can be included in one chip (e.g., guard source chip), and capacitor 730 can be a discrete component (e.g., separate from touch sensing chip 704 and the chip in which guard source 726 is included) coupled in the electrical pathway between the guard source chip and touch sensing chip 704. In some examples, capacitor 730 can be included in touch sensing chip 704 if the current requirements of capacitor 730/touch sensing chip 704 are sufficiently small.

In some examples, particularly when touch sensing chip 704 is separate from the chip on which guard source 726 is disposed or fabricated, the resistances between the output of guard source 726 and node A (e.g., the node on or near touch sensing chip 704 at which guard plane 720 and capacitor 730 can be coupled) can be substantial. These resistances, which can include resistances such as the output resistance of guard source 726, trace resistances between guard source 726 and touch sensing chip 704, bond pad resistances, etc., can be represented by resistance 728 in FIG. 7A. Further, during the time periods when guard signal 721 is low and when switch 734 is closed to charge capacitor 730, current can flow from DC voltage source 736, through capacitor 730, resistance 728 and guard source 726, to chassis or earth ground 706 via current path 740. This current, which can flow through resistance 728, can cause the voltage at node A to differ from (e.g., be higher, or more positive than) the voltage at the output of guard source 726. Additionally, this current can change as a function of time, as it can decrease as capacitor 730 becomes charged to the desired DC voltage by DC voltage source 736. Therefore, the amount by which the voltage at node A differs from the voltage at the output of guard source 726 can also change as a function of time while guard signal 721 is low.

Figure 7B:
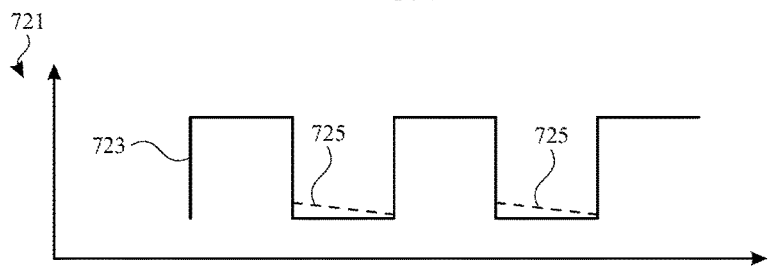
FIG. 7B illustrates an exemplary guard signal at node A in FIG. 7A according to examples of the disclosure.

FIG. 7B illustrates exemplary guard signal 721 at node A in FIG. 7A according to examples of the disclosure. Solid lines 723 can represent the ideal or desired guard signal 721 to be provided to node A in FIG. 7A. When guard signal 721 transitions from high to low, because of resistance 728 and current path 740, instead of reaching the desired low voltage point immediately, the guard signal at node A can gradually, over time, reach the desired low voltage point, as illustrated by dashed lines 725. In some examples, guard signal 721 at node A may not reach the desired low voltage point by the time the guard signal transitions from low to high. As a result, guard signal 721 at node A can be unknown and can change over time, which can cause errors in touch sensing performance, as described above. In other words, because guard signal 721 at node A can be used by touch sensing circuitry in touch sensing chip 704 to sense touch on the touch sensor panel, errors in the guard signal voltage at node A can directly introduce errors into the touch signals outputted by the touch sensing circuitry. Therefore, it can be desirable to include a mechanism in configuration 700 for better regulating the voltage at node A, particularly in circumstances in which guard source 726 and touch sensing circuitry are included in separate and distinct chips.

Figure 8A:
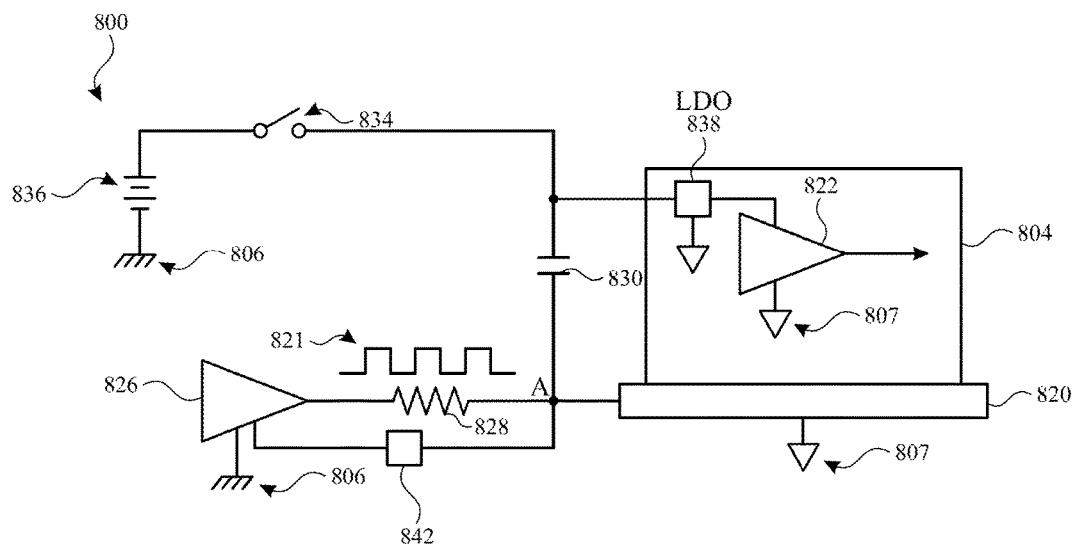
FIG. 8A illustrates an exemplary guard stimulus voltage delivery configuration for delivering a guard stimulus voltage to a touch sensing chip using a voltage regulator according to examples of the disclosure.

FIG. 8A illustrates an exemplary voltage delivery configuration 800 for delivering voltage to touch sensing chip 804 using voltage regulator 842 according to examples of the disclosure. Configuration 800 of FIG. 8A can be the same as configuration 700 of FIG. 7A, except that configuration 800 can include voltage regulator 842 coupled between node A and guard source 826 (e.g., voltage regulator 842 can be coupled to one or more inputs of guard source 826). For example, switch 834, like switch 734, can be current-limited or otherwise regulated to reduce or minimize inrush current into capacitor 830 (e.g., limited to only allow current below a current threshold), and/or reduce or minimize load current variations from voltage source 836. Other components of configuration 800 can similarly be the same as components of configuration 700. Voltage regulator 842 can regulate the voltage at node A while guard signal 821 is low and/or high, as will be described in more detail below, to provide a guard signal for guard plane 820 and for use by touch sensing chip 804 that is stable and known.

Figure 8B:
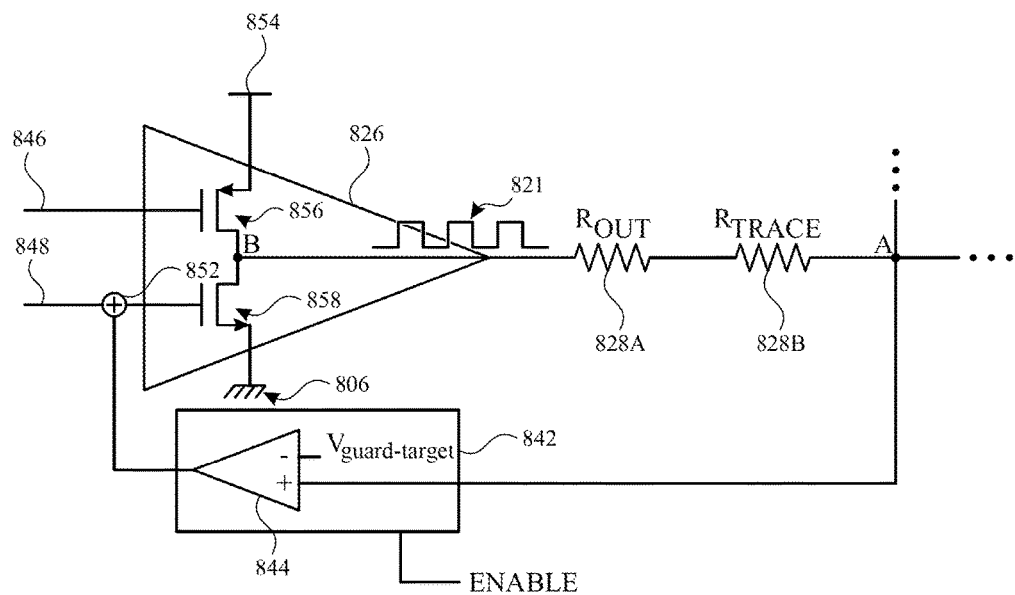
FIG. 8B illustrates exemplary details of a guard source and a voltage regulator according to examples of the disclosure.

FIG. 8B illustrates exemplary details of guard source 826 and voltage regulator 842 according to examples of the disclosure. In some examples, guard source 826 can comprise a push-pull configuration of P-FET 856 and N-FET 858 (though other configurations of guard source 826 can also be utilized) in which the source of P-FET 856 can be coupled to high voltage rail 854, the drain of P-FET 856 can be coupled to the drain of N-FET 858, and the source of N-FET 858 can be coupled to chassis or earth ground 806. Guard source 826 can have input 846 and input 848, which can provide input voltage signals to P-FET 856 and N-FET 858, respectively. For example, when guard source 826 is to output a high voltage, inputs 846 and 848 can be low such that P-FET 856 is on, and N-FET 858 is off. Analogously, when guard source 826 is to output a low voltage, inputs 846 and 848 can be high such that P-FET 856 is off, and N-FET 858 is on. Node B can represent the output node of guard source 826. Node B can be coupled to node A (corresponding to node A in FIG. 8A). Resistances $R_{out}$ 828A and $R_{trace}$ 828B, which can correspond to the output resistance of guard source 826 and the resistance of traces that couple guard source 826 and node A, respectively, can represent the resistances between node A and guard source 826.

Voltage regulator 842 can be coupled between node A and guard source 826. Specifically, voltage regulator 842 can include amplifier 844 having two inputs: an input from node A coupled to the non-inverting input of amplifier 844, and $V_{guard-target}$ coupled to the inverting input of amplifier 844, which can be the desired guard voltage at node A. The output of amplifier 844 (and thus voltage regulator 842) can be coupled to input 848 via summer 852. Further, voltage regulator 842 can receive an ENABLE signal which can control whether or not amplifier 844 is operational, as will be discussed below. The ENABLE signal can be timed to guard signal 821 outputted by guard source 826 (e.g., using appropriate circuitry with provisions for precise timing control) such that when guard signal 821 is low, the ENABLE signal can be active (e.g., high), which can cause amplifier 844 to be operational (e.g., amplifier 844 can output a signal), and when guard signal 821 is high, the ENABLE signal can be inactive (e.g., low), which can cause amplifier 844 to be nonoperational (e.g., amplifier 844 can not output a signal).

The operation of voltage regulator 842 in conjunction with guard source 826 will now be described. Voltage regulator 842 can perform low- and/or high-side voltage regulation at node A. Low-side voltage regulation (e.g., regulating the voltage at node A when guard signal 821 is low) will be described with reference to FIG. 8B, but it is understood that high-side voltage regulation (e.g., regulating the voltage at node A when guard signal 821 is high) can be analogously implemented. For example, voltage regulator 842 can regulate the voltage at node A when guard signal 821 outputted by guard source 826 is low. Specifically, the output of voltage regulator 842 can be coupled to input 848, as shown in FIG. 8B, and $V_{guard-target}$ can be set to the desired voltage at node A when guard signal 821 is low. For example, $V_{guard-target}$ can be a voltage slightly above chassis or earth ground 806, such as 0.1V or 0.2V. When guard signal 821 is low, the ENABLE signal inputted to voltage regulator 842 can be active, which can cause amplifier 844 to be operational, and if the voltage at node A deviates from $V_{guard-target}$, amplifier 844 can output a signal corresponding to the deviation, which can be added to input 848 via summer 852 to change the gate voltage of N-FET 858 until the voltage at node A reaches $V_{guard-target}$. As such, even though current may flow through $R_{out}$ 828A and $R_{trace}$ 828B, and even if that current varies as a function of time (e.g., as described with reference to current path 740 in FIG. 7A), voltage regulator 842 can maintain the voltage at node A at $V_{guard-target}$. It should be noted that $V_{guard-target}$ may not be able to be set to the voltage at chassis or earth ground 806 (e.g., 0V), because of the existence of $R_{out}$ 828A and $R_{trace}$ 828B. Therefore, the voltage at node A when guard signal is low may not be able to reach chassis or earth ground 806, but rather may be maintained at a level slightly above (e.g., 0.1V, 0.2V, etc.) chassis or earth ground 806.

As previously mentioned, voltage regulator 842 (or separate voltage regulation circuitry that is analogously structured and/or operates analogously to voltage regulator 842) can additionally or alternatively perform high-side voltage regulation at node A. For example, such voltage regulation circuitry can regulate the voltage at node A when guard signal 821 outputted by guard source 826 is high. Specifically, the output of such voltage regulation circuitry can be coupled to input 846, and $V_{guard-target}$ for that voltage regulation circuitry can be set to the desired voltage at node A when guard signal 821 is high. For example, $V_{guard-target}$ can be a voltage slightly above high voltage rail 854 (e.g., above high voltage rail by 0.1V, 0.2V, etc.). If the voltage at node A deviates from $V_{guard-target}$, the voltage regulation circuitry can output a signal corresponding to the deviation, which can be added to input 846 via a summer to change the gate voltage of P-FET 856 until the voltage at node A reaches $V_{guard-target}$. As such, even though current may flow through $R_{out}$ 828A and $R_{trace}$ 828B, and even if that current varies as a function of time (e.g., as described with reference to current path 740 in FIG. 7A), the voltage regulation circuitry can maintain the voltage at node A at $V_{guard-target}$. It should be noted that $V_{guard-target}$ may not be able to be set to the voltage at high voltage rail 854, because of the existence of $R_{out}$ 828A and $R_{trace}$ 828B (e.g., current may flow from node A through $R_{out}$ 828A and $R_{trace}$ 828B to high voltage rail 854). Therefore, the voltage at node A when guard signal is high may not be able to reach the voltage at high voltage rail 854, but rather may be maintained at a level slightly above (e.g., 0.1V, 0.2V, etc. above) the voltage at high voltage rail 854.

Figure 8C:
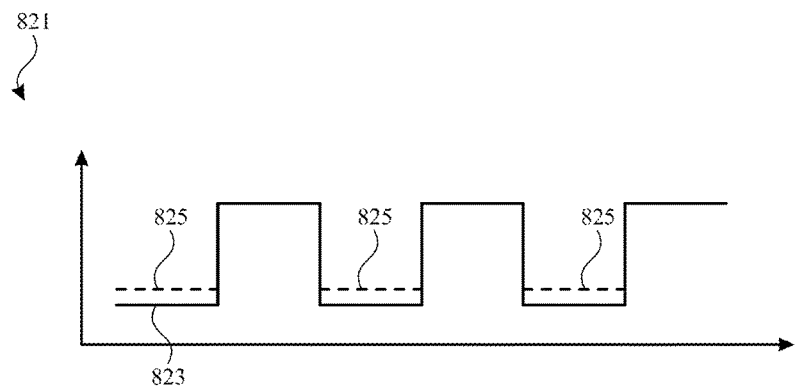
FIG. 8C illustrates an exemplary guard signal at node A of FIGS. 8A-8B resulting from low- and/or high-side voltage regulation according to examples of the disclosure.

FIG. 8C illustrates exemplary guard signal 821 at node A of FIGS. 8A-8B resulting from low-side voltage regulation according to examples of the disclosure. Solid lines 823 can represent the ideal or desired guard signal 821 to be provided to node A in FIGS. 8A-8B, and dashed lines 825 can correspond to the voltage at node A maintained by voltage regulator 842. As shown, the voltages maintained by voltage regulator 842 at node A during time periods when guard signal 821 is low can slightly deviate from the ideal; however, the voltages at node A can be stable and known, and thus may not interfere with accurate touch detection by touch sensing chip 804. In circumstances in which high-side voltage regulation is implemented, the voltages maintained at node A during time periods when guard signal is high can similarly slightly deviate from the ideal (e.g., slightly above the ideal voltages), as described above.

Figure 8D:
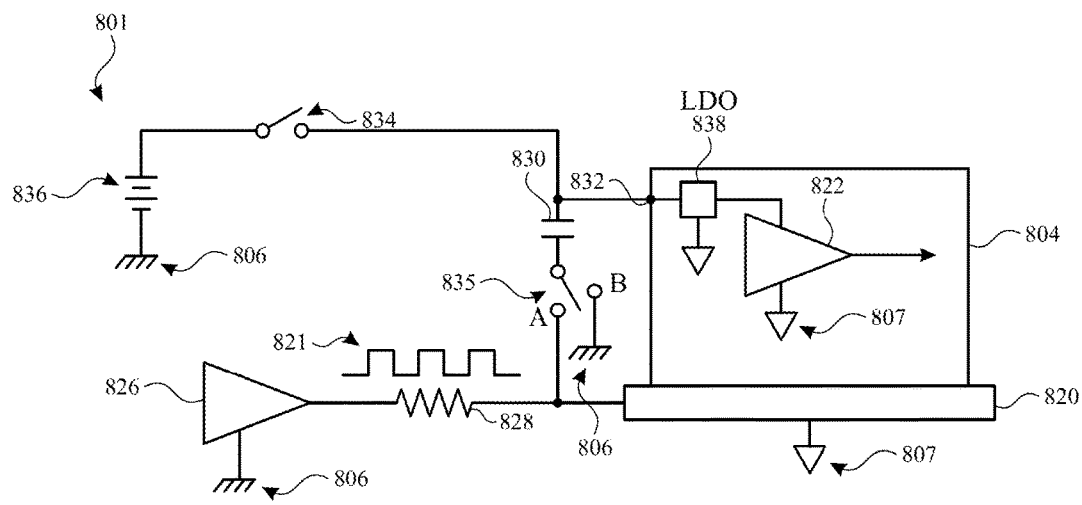
FIG. 8D illustrates another exemplary guard stimulus voltage delivery configuration for delivering a guard stimulus voltage to a touch sensing chip in which a capacitor is selectively coupled to node A of FIG. 7A according to examples of the disclosure.

FIG. 8D illustrates another exemplary voltage delivery configuration 801 for delivering voltage to touch sensing chip 804 in which capacitor 830 is selectively coupled to node A according to examples of the disclosure. Configuration 801 of FIG. 8D can be the same as configuration 700 of FIG. 7A, except that configuration 801 can include switch 835 coupled between capacitor 830 and node A. Specifically, as discussed above, current flowing from voltage source 836 through capacitor 830 and resistance 828 to guard source 826 when guard signal 821 is low can cause the voltage at node A to fluctuate from a desired or known guard voltage. To address this, in configuration 801, switch 835 can be coupled between capacitor 830 and node A, as shown in FIG. 8D. While guard signal 821 is low (e.g., at earth or chassis ground 806, or at approximately earth or chassis ground 806), switch 835 can couple capacitor 830 to node B, which can be coupled to earth or chassis ground 806, and can decouple capacitor 830 from node A. As such, capacitor 830 can continue to be coupled to the low voltage level of guard signal 821—e.g., earth or chassis ground 806, or approximately earth or chassis ground 806—which can be provided by node B rather than by guard source 826. While guard signal 821 is high, switch 835 can couple capacitor 830 to node A, and can decouple capacitor 830 from node B. As a result, while guard signal 821 is low, no pathway can exist for current to flow from voltage source 836 through capacitor 830 and resistance 828 to guard source 826, because switch 835 can decouple capacitor 830 from node A while guard signal 821 is low. Rather, while guard signal 821 is low, current can flow from voltage source 836 through capacitor 830 directly to earth or chassis ground 806 through node B, to which switch 835 can couple capacitor 830 while guard signal 821 is low. Therefore, the effect of such current flow on the voltage at node A can be reduced or eliminated without the use of voltage regulator 842 in FIGS. 8B-8C. More generally, the voltage at node B can be whatever the intended low voltage output of guard source 826 is (e.g., chassis ground, 1V below chassis ground, 1V above chassis ground, etc.), except that the voltage at node B can be provided, not by guard source 826, but by another separate voltage source that outputs, to node B, the low voltage value corresponding to the low side of guard signal 821.

Switch 835 can be implemented as a physical switch, a solid state switch (e.g., comprised of one or more transistors), or any other design for performing the above-described functions. In some examples, switch 835 can be current-limited or otherwise regulated to reduce or minimize inrush current into/through capacitor 830 (e.g., limited to only allow current below a current threshold), and/or reduce or minimize load current variations from voltage source 836. Further, in some examples, switch 835 can switch between nodes A and B in synchronization with guard signal 821 transitioning between low and high (e.g., switch 835 can switch from node A to node B at the same time that guard signal 821 transitions from high to low, etc.). However, in other examples, switch 835 can switch between nodes A and B in synchronization with, but with a slight delay with respect to, guard signal 821 transitioning between low and high (e.g., switch 835 can switch from node A to node B some predetermined time after guard signal 821 transitions from high to low, etc.) in order to reduce spikes or other fluctuations in voltage at node A that might occur when switch 835 decouples capacitor 830 from node A or B, and couples capacitor 830 to node B or A, respectively. In such examples, the timing delay of switch 835 switching between nodes A and B can be predetermined (e.g., a predetermined time, a predetermined change in voltage of guard signal 821 during the transitions between low and high, etc.). In some examples, circuitry external to switch 835 can control the switching of switch 835 between nodes A and B as described above (e.g., by monitoring the passage of time since guard signal transitioned from low to high, by monitoring the voltage of guard signal 821 and/or the voltage at node A since guard signal transitioned from low to high, etc.).

As shown above, various configurations for the guard buffer (e.g., guard source 626 in FIG. 6E or guard source 826 in FIG. 8B) of the disclosure have been provided. However, in some examples, the guard buffer of the disclosure can be a hybrid of the push-pull buffer (e.g., in FIG. 8B) and the linear buffer (e.g., in FIG. 6E) disclosed in this application so as to exhibit one or more of the benefits of both. For example, the guard buffer can operate as a linear buffer during the time periods when the guard signal is LOW and during the transitions of the guard signal from LOW to HIGH and/or HIGH to LOW when high linearity and low noise can be required (e.g., a linear buffer can have good linearity but can require more power than a push-pull buffer due to the required output headroom and/or bias currents needed for internal structures, such as input/output stages). In contrast, the guard buffer can operate as a push-pull buffer during the time periods when the guard signal is HIGH (e.g. the PMOS in the output stage of the guard buffer can be fully turned on as opposed to being regulated). A push-pull buffer can have worse linearity than a linear buffer, but can require less power than a linear buffer because it may not require the output headroom of the linear buffer and/or the quiescent current budget of a linear buffer. A benefit of the above-described operation can be that during the guard signal HIGH phase, output headroom (e.g., headroom needed relative to the guard signal LOW and/or HIGH voltages) for the guard buffer may not have to be allocated, because the guard buffer can operate as a push-pull buffer. As such, the positive supply of the guard buffer can be lowered, therefore saving power.

In some examples, the touch sensing system of the disclosure can configure the touch sensing circuitry to operate in different modes of operation for sensing touch at different times. For example, the touch sensing circuitry can be capable of operating in one of two or more modes of operation, and can switch between those modes of operation in response to various criteria being satisfied. In some examples, the touch sensing circuitry can be capable of operating in one of three modes: 1) a RESET off mode, 2) a DC restore mode, and 3) a scan step RESET mode, as will now be described with reference to FIGS. 3A-3B. In particular, in the RESET off mode, the RESET control signal can maintain switch 315 in an open position throughout a touch scan step, and in the DC restore mode and the scan step RESET mode, the RESET control signal can close switch 315 at different times in a touch scan step, as discussed below.

With respect to the RESET off mode, as described above, switch 315 can remain open throughout a touch scan step of the touch screen (e.g., which can extend for one or more periods of guard signal 721 and/or 821). In this mode, amplifier 308 in sense circuit 314 can be configured as a trans-impedance amplifier with a feedback impedance comprising resistor 312 and/or capacitor 310. In such a configuration, resistor 312 can dominate the overall feedback impedance of amplifier 308. As a result, the ouput of amplifier 308 (e.g., Vo) can settle relatively quickly. The touch sensing system can configure sensing circuit 314 to operate in the RESET off mode in circumstances in which sensing circuit 314 is sensing touch across greater than a threshold number of touch electrodes simultaneously (e.g., greater than two, five or ten touch node electrodes 302), and may configure sensing circuit 314 to operate in a different mode (e.g., the DC restore mode or the scan step RESET mode) in circumstances in which sensing circuit 314 is sensing touch across less than or equal to the threshold number of touch electrodes simultaneously. A reason for configuring sensing circuit 314 in the RESET off mode when sensing circuit 314 is sensing touch across greater than the threshold number of touch electrodes simultaneously can be that in such circumstances, the input signal from those touch electrodes to amplifier 308 can be more than capacitor 310 may be able to absorb without amplifier 308 saturating. As such, in order to reduce the feedback impedance of amplifier 308, resistor 312 can be maintained in the feedback loop of amplifier 308 (e.g., by maintaining switch 315 in an open position) such that the feedback impedance can be dominated by resistor 312, which can enable relatively fast settling of the output of sensing circuit 314.

Figure 8E:
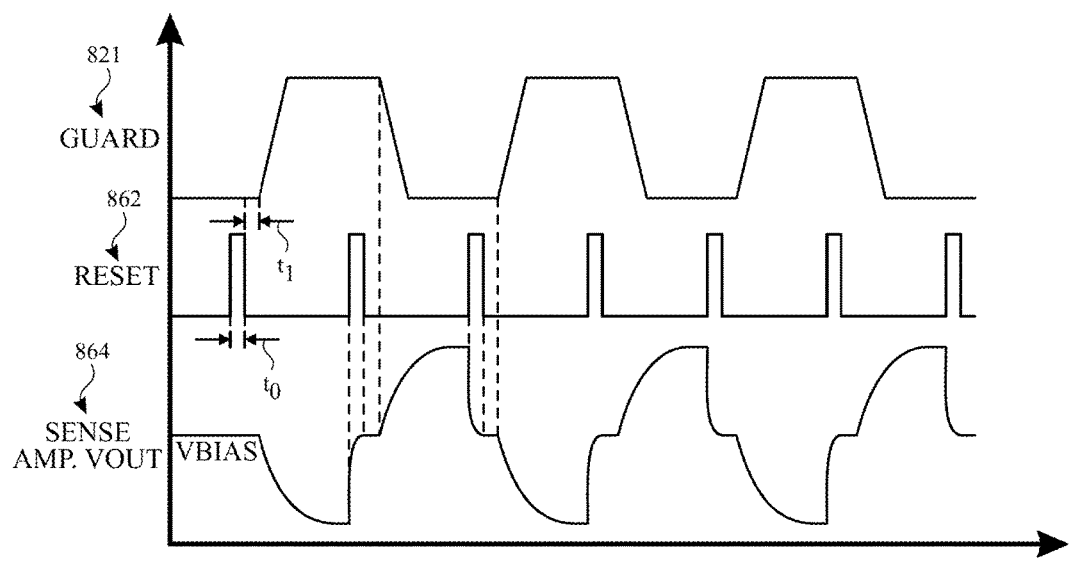
FIG. 8E illustrates an exemplary timing diagram that relates the guard signal, the RESET signal, and the output of a sensing circuit during the DC restore mode according to examples of the disclosure.

With respect to the DC restore mode, amplifier 308 in sense circuit 314 can be configured as a charge amplifier, and switch 315 can remain open throughout a touch scan step of the touch screen, except that switch 315 can be closed one or more times during a period of guard signal 721 and/or 821 (e.g., multiple times during the touch scan step of the touch screen) to facilate maintenance of the desired common mode voltage of the output Vo of amplifier 308 throughout the touch scan step of the touch screen. For example, FIG. 8E illustrates an exemplary timing diagram that relates guard signal 821, RESET signal 862, and the output 864 of sensing circuit 314 during the DC restore mode. As shown, RESET signal 862 can be asserted (and thus close switch 315) before each transition of guard signal 821 (e.g., low to high transitions, and high to low transitions), such as during time t0 before the transition of guard signal 821 from low to high. RESET signal 862 can then be de-asserted time t1 before the low to high transition of guard signal 821. In some examples, such assertion/de-assertion can continue before each transition of guard signal 821, as shown in FIG. 8E. While RESET signal 862 is asserted, switch 315 can be closed, which can facilitate the output of sensing circuit 314 to return to the desired common mode voltage of sensing circuit (e.g., $V_{BIAS}$ in FIG. 8E) before the next transition of guard signal 821 occurs.

Figure 8F:
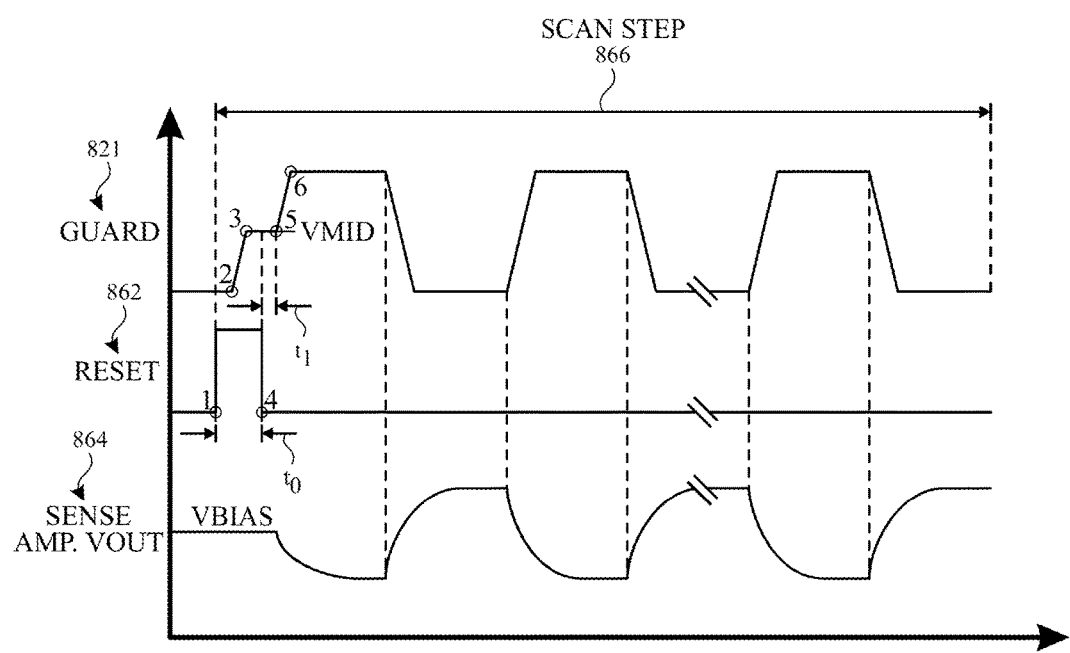
FIG. 8F illustrates an exemplary timing diagram that relates the guard signal, the RESET signal, and the output of a sensing circuit during the scan step RESET mode according to examples of the disclosure.

With respect to the scan step RESET mode, amplifier 308 in sense circuit 314 can be configured as a charge amplifier, and switch 315 can remain open throughout a touch scan step of the touch screen, except that switch 315 can be closed once at the beginning of the touch scan step (e.g., which can extend for one or more periods of guard signal 721 and/or 821) to facilate fast settling of amplifier 308 before touch sensing begins that might otherwise be limited by the RC time constant attributable to resistor 312 and capacitor 310 in sensing circuit 314. For example, FIG. 8F illustrates an exemplary timing diagram that relates guard signal 821, RESET signal 862, and the output 864 of sensing circuit 314 during the scan step RESET mode. As shown, RESET signal 862 can be asserted (and thus close switch 315) at point 1 for time t0. During time t0, at point 2, guard signal 821 can transition from low to a programmed common mode level $V_{MID}$, and can reach $V_{MID}$ at point 3 according to a programmed rise time. Guard signal 821 can remain at $V_{MID}$ from point 3 to point 5. At point 4, between points 3 and 5, RESET signal 862 can be de-asserted, and time t1 later, at point 5, guard signal 821 can transition from $V_{MID}$ to high, and can reach high at point 6 according to a programmed rise time. RESET signal 862 can remain de-asserted for the remainder of touch scan step 866, as shown. In this way, settling of output 864 of amplifier 308 to $V_{BIAS}$ before touch sensing is performed can be facilitated. If output 864 were not settled to $V_{BIAS}$ before the start of touch sensing at the beginning of scan step 866, that unsettled portion of output 864 could consume dynamic range of sensing circuit 314, which could degrade interference/noise rejection of the touch sensing system.

Whether the touch sensing system configures sensing circuit 314 to operate in the DC restore mode or the scan step RESET mode can depend on the results of a spectral analysis step performed by the touch sensing system (e.g., a touch scan step that is performed during which the touch sensing system senses signals from the touch electrodes on the touch screen during a time when there is no touch activity on the touch screen, thus capturing and identifying noise or other interference sources). For example, the touch sensing system can perform a spectral analysis step, and can identify a noise profile that is present at the touch screen. Based on that noise profile, the touch sensing sytem can configure sensing circuit 314 to operate in the DC restore mode or the scan step RESET mode (when it is not operating in the RESET off mode). DC restore mode can provide better low frequency interference rejection than scan step RESET mode for certain guard signal stimulation frequencies (e.g., 60 Hz or 120 Hz); thus, if the spectral analysis indicates noise or interferers present at low frequencies (e.g., lower than a threshold frequency), the touch sensing system can select the DC restore mode. However, the DC restore mode can induce aliasing at amplifier 308, which can degrade interference rejection at other frequencies. As such, the touch sensing system can, based on these and/or other factors, determine in which of the DC restore mode and the scan step RESET mode to configure sensing circuit 314. For example, if the spectral analysis indicates noise or interferers present at high frequencies (e.g., higher than the threshold frequency), the touch sensing system can select the scan step RESET mode. The touch system operations illustrated by FIGS. 8E-8F can be utilized with any of the touch sensing system configurations described with reference to FIGS. 1-9 of the disclosure.

With reference to FIGS. 8E-8F, in some examples, one or more touch node electrodes on the touch sensor panel may be driven at a reference voltage (e.g., at the guard signal voltage) while one or more other touch node electrodes are being sensed for touch. The touch node electrodes being sensed can be coupled to touch sensing circuitry (e.g., as described with reference to FIGS. 3A-3B), which can operate in accordance with RESET 862 in FIGS. 8E and/or 8F. The touch node electrodes being driven at the reference voltage but not sensed can be coupled, not to touch sensing circuitry, but to separate driving circuitry (e.g., buffered drive amplifiers)—the separate driving circuitry may not include a RESET switch 315, and thus may operate independently of RESET 862 in FIGS. 8E and/or 8F.

As previously described, in some examples, the touch sensing chip of the disclosure can be a separate and distinct chip than other chips in the touch sensing system (e.g., guard source chip, touch processor chip, host system chip, etc.). Further, the touch sensing chip can be guarded by a guard plane reference voltage that can be different than chassis or earth ground to which the other chips in the touch sensing system can be grounded. In some examples, the other chips in the touch sensing system may need to communicate with the touch sensing chip, in which case level shifters may need to be included in the communication link(s) between the touch sensing chip and the other chips to account for the different power domains in which the touch sensing chip and the other chips in the touch sensing system operate.

Figure 9:
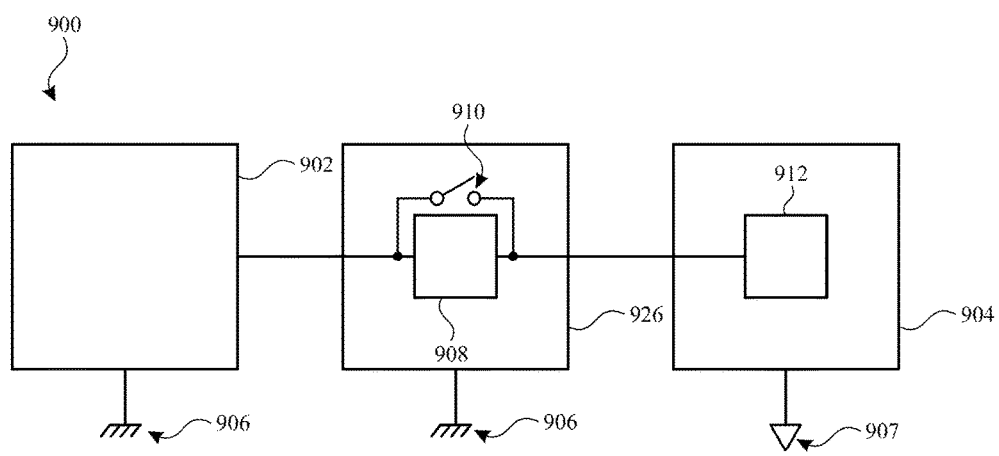
FIG. 9 illustrates an exemplary level shifter configuration according to examples of the disclosure.

FIG. 9 illustrates an exemplary level shifter configuration 900 according to examples of the disclosure. Touch sensing chip 904 can be referenced to guard reference 907, as described in this disclosure (e.g., operated in the guard power domain). Touch sensing chip 904 can also include touch microcontroller 912, which can correspond to touch controller 206 and/or touch processor 202 in FIG. 2 for controlling and/or processing the touch sensing performed by touch sensing chip 904. Touch microcontroller 912 can include various logic, memory, touch sensing circuitry, etc. for sensing touch on a touch sensor panel. Touch microcontroller 912 can be communicatively coupled to host 902, which can be referenced to chassis or earth ground 906 (e.g., operated in the chassis or earth ground power domain). Host 902 can correspond to the host processor and/or system of the device in which configuration 900 is included (e.g., devices 136, 140, 144 and 148 in FIGS. 1A-1D), and can include host processor 228 and/or program storage 232 in FIG. 2. Host 902 can be a distinct and separate chip from touch sensing chip 904 and/or guard signal generation chip 926, though in some examples, host 902 can be on the same chip as guard signal generation chip 926.

Host 902 may need to communicate data to/from touch microcontroller 912. For example, when the device in which configuration 900 is included is first powered on, host 902 can transmit information about touch scanning to touch microcontroller 912 (e.g., information about how touch microcontroller 912 should sense touch on the touch sensor panel, such as which touch node electrodes to sense, ground, bias, etc. at any given moment in time) to properly configure touch microcontroller 912. Because host 902 and touch sensing chip 904 (and thus touch microcontroller 912) can be in different power domains (e.g., grounded to chassis/earth ground 906 vs. grounded to guard ground 907), communications between host 902 and touch microcontroller 912 can be appropriately level-shifted between the power domains by level shifter(s) 908. In some examples, host 902 can be communicatively coupled to touch microcontroller 912 via guard signal chip 926, which can also be referenced to chassis or earth ground 906. Thus, in some examples, level shifter(s) 908, which can be included in the communication link between host 902 and touch sensing chip 904, can be included in guard signal chip 926.

In some examples, the amount of data that host 902 needs to communicate to/from touch sensing chip 904 can be substantial, and level-shifting the data between the power domains of host 902 and touch sensing chip 904 can slow down the speed of such communication between the two chips. Therefore, in some examples, guard signal chip 926 can include bypass switch 910, which can selectively bypass level shifter(s) 908 on the communication link between host 902 and touch sensing chip 904, when appropriate. For example, when guard signal chip 926 is not generating a guard signal for the guard plane of touch sensing chip 904, or when the guard signal is in the low state (and thus, the voltage of the guard signal is substantially the same as the voltage at chassis or earth ground 906), switch 910 can be closed to bypass level shifter(s) 908 and increase the rate of communication possible between host 902 and touch sensing chip 904. Otherwise (e.g., when the guard signal is in the high state), switch 910 can be open, and host 902 can communicate with touch sensing chip 904 via level shifter(s) 908 (i.e., level shifter(s) 908 may not be bypassed).

Thus, the examples of the disclosure provide various configurations for operating a touch sensing chip in a different power domain than other chips in a touch sensing system, which can improve the touch sensing performance of the system.

Therefore, according to the above, some examples of the disclosure are directed to a touch sensing system comprising: a guard signal generation chip operating in a first power domain referenced to a first voltage, the guard signal generation chip configured to generate a guard signal; a touch sensing chip operating in a second power domain, different from the first power domain, referenced to the guard signal, the touch sensing chip configured to sense touch at one or more touch electrodes included in a touch sensor panel operating in the second power domain referenced to the guard signal, and the touch sensing chip a different chip than the guard signal generation chip; and a voltage regulator configured to selectively regulate a voltage of the guard signal at the touch sensing chip. Additionally or alternatively to one or more of the examples disclosed above, in some examples the first power domain is referenced to a chassis ground of an electronic device in which the touch sensing system is included, or to earth ground. Additionally or alternatively to one or more of the examples disclosed above, in some examples the guard signal comprises an AC voltage. Additionally or alternatively to one or more of the examples disclosed above, in some examples the touch sensing chip is disposed on a guard plane electrically connected to the guard signal generation chip and configured to be driven with the guard signal. Additionally or alternatively to one or more of the examples disclosed above, in some examples the touch sensing chip includes touch sensing circuitry configured to sense touch at the one or more touch electrodes using the guard signal. Additionally or alternatively to one or more of the examples disclosed above, in some examples the touch sensing system further comprises: a flex circuit including: one or more traces configured to electrically couple the touch sensing chip to the touch sensor panel; and one or more shields configured to isolate the one or more traces from the first power domain, wherein: the touch sensing chip is disposed on a guard plane configured to isolate the touch sensing chip from the first power domain, the touch sensor panel includes one or more shields configured to isolate the one or more touch electrodes from the first power domain, and the guard plane, the one or more shields included in the flex circuit, and the one or more shields included in the touch sensor panel are electrically connected to the guard signal generation chip and are configured to be driven by the guard signal. Additionally or alternatively to one or more of the examples disclosed above, in some examples the voltage regulator is configured to: while the guard signal is in a first state, regulate the voltage of the guard signal at the touch sensing chip to a respective voltage, and while the guard signal is in a second state, different from the first state, forgo regulating the voltage of the guard signal at the touch sensing chip to the respective voltage. Additionally or alternatively to one or more of the examples disclosed above, in some examples the guard signal is in the first state when the guard signal is in a low voltage state, and the guard signal is in the second state when the guard signal is in a high voltage state. Additionally or alternatively to one or more of the examples disclosed above, in some examples the respective voltage is a low voltage. Additionally or alternatively to one or more of the examples disclosed above, in some examples the guard signal is in the first state when the guard signal is in a high voltage state, and the guard signal is in the second state when the guard signal is in a low voltage state. Additionally or alternatively to one or more of the examples disclosed above, in some examples the respective voltage is a high voltage. Additionally or alternatively to one or more of the examples disclosed above, in some examples the voltage regulator comprises an amplifier including: an input electrically coupled to the guard signal at the touch sensing chip; and an output electrically coupled to the guard signal generation chip. Additionally or alternatively to one or more of the examples disclosed above, in some examples the voltage regulator is configured to adjust the output of the amplifier based on a deviation of the guard signal at the touch sensing chip from a target voltage, the adjustment of the output of the amplifier causing the guard signal generation chip to adjust the guard signal. Additionally or alternatively to one or more of the examples disclosed above, in some examples the touch sensing system further comprises: a host chip operating in the first power domain, the host chip communicatively coupled to the touch sensing chip via a communication link, and the host chip configured to communicate data to the touch sensing chip via the communication link. Additionally or alternatively to one or more of the examples disclosed above, in some examples the touch sensing system further comprises one or more level shifters included in the communication link, the one or more level shifters configured to adjust a level of the data from the first power domain to the second power domain. Additionally or alternatively to one or more of the examples disclosed above, in some examples the one or more level shifters are configured to be selectively bypassed during the communication of the data from the host chip to the touch sensing chip. Additionally or alternatively to one or more of the examples disclosed above, in some examples during the communication of the data from the host chip to the touch sensing chip, the one or more level shifters are configured to be: bypassed when the guard signal generation chip is not generating the guard signal, and not bypassed when the guard signal generation chip is generating the guard signal. Additionally or alternatively to one or more of the examples disclosed above, in some examples during the communication of the data from the host chip to the touch sensing chip, the one or more level shifters are configured to be: bypassed when the guard signal is in a low state, and not bypassed when the guard signal is in a high state. Additionally or alternatively to one or more of the examples disclosed above, in some examples the guard signal generation chip comprises a direct digital synthesizer, a digital-to-analog converter and a buffer, an output of the direct digital synthesizer coupled to an input of the digital-to-analog converter, an output of the digital-to-analog converter coupled to an input of the buffer, and an output of the buffer outputting the guard signal generated by the guard signal generation chip. Additionally or alternatively to one or more of the examples disclosed above, in some examples the touch sensing chip is configured to receive a low voltage and a high voltage, the low voltage corresponding to the guard signal, and the high voltage based on the low voltage and generated using a capacitor and a switch, the switch configured to limit an amount of current flowing into the capacitor to less than a threshold amount. Additionally or alternatively to one or more of the examples disclosed above, in some examples the guard signal generation chip includes circuitry configured to generate the guard signal, the circuitry is configured to operate as a linear buffer when the guard signal is in a low state, and the circuitry is configured to operate as a push-pull buffer when the guard signal is in a high state. Additionally or alternatively to one or more of the examples disclosed above, in some examples the touch sensing chip is configured to selectively reset a sense amplifier that is configured to sense the touch at the one or more touch electrodes based on one or more of a number of touch electrodes the sense amplifier is sensing simultaneously and a spectral scan of the touch sensor panel Some examples of the disclosure are directed to an electronic device comprising: a touch sensor panel including one or more touch electrodes; a guard signal generation chip operating in a first power domain referenced to a first voltage, the guard signal generation chip configured to generate a guard signal; a touch sensing chip operating in a second power domain, different from the first power domain, referenced to the guard signal, the touch sensing chip configured to sense touch at the one or more touch electrodes included in the touch sensor panel operating in the second power domain referenced to the guard signal, and the touch sensing chip a different chip than the guard signal generation chip; and a voltage regulator configured to selectively regulate a voltage of the guard signal at the touch sensing chip.

Some examples of the disclosure are directed to a method for operating a touch sensing system, the method comprising: operating a guard signal generation chip in a first power domain referenced to a first voltage, the guard signal generation chip configured to generate a guard signal; operating a touch sensing chip in a second power domain, different from the first power domain, referenced to the guard signal, the touch sensing chip configured to sense touch at one or more touch electrodes included in a touch sensor panel operating in the second power domain referenced to the guard signal, and the touch sensing chip a different chip than the guard signal generation chip; and selectively regulating a voltage of the guard signal at the touch sensing chip.

Some examples of the disclosure are directed to a touch sensing system comprising: a guard signal generation chip operating in a first power domain referenced to a first voltage, the guard signal generation chip configured to generate a guard signal; a touch sensing chip operating in a second power domain, different from the first power domain, referenced to the guard signal, the touch sensing chip configured to sense touch at one or more touch electrodes included in a touch sensor panel operating in the second power domain referenced to the guard signal, and the touch sensing chip a different chip than the guard signal generation chip; and switching circuitry configured to selectively couple a voltage input of the touch sensing chip to the guard signal generation chip based on a state of the guard signal. Additionally or alternatively to one or more of the examples disclosed above, in some examples, the switching circuitry is configured to: couple the voltage input of the touch sensing chip to the guard signal when the state of the guard signal is a first state, and couple the voltage input of the touch sensing chip to the first voltage when the state of the guard signal is a second state, different from the first state.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensing system comprising:
a guard signal generation chip operating in a first power domain referenced to a first voltage, the guard signal generation chip configured to generate a guard signal;
a touch sensing chip operating in a second power domain, different from the first power domain, referenced to the guard signal, the touch sensing chip configured to sense touch at one or more touch electrodes included in a touch sensor panel operating in the second power domain referenced to the guard signal, and the touch sensing chip a different chip than the guard signal generation chip,
wherein:
the touch sensing chip is configured to receive a low voltage at a low voltage input node of the touch sensing chip, and a high voltage at a high voltage input node of the touch sensing chip,
the low voltage corresponds to the guard signal, and
the high voltage is generated based on at least the guard signal and is referenced to the guard signal.

2. The touch sensing system of claim 1, further comprising:
a capacitor coupled between the low voltage input node and the high voltage input node,
wherein the high voltage is generated using the capacitor.

3. The touch sensing system of claim 2, wherein generating the high voltage using the capacitor includes charging the capacitor until a respective DC voltage is built up across the capacitor.

4. The touch sensing system of claim 3, further comprising:
a switch coupled to a first terminal of the capacitor, wherein:
the first terminal of the capacitor is also coupled to the high voltage input node of the touch sensing chip, and
generating the high voltage using the capacitor includes selectively closing the switch coupled to the first terminal of the capacitor.

5. The touch sensing system of claim 4, wherein:
the switch includes a first terminal and a second terminal,
the first terminal of the switch is coupled to the first terminal of the capacitor, and
the second terminal of the switch is coupled to a DC voltage source.

6. The touch sensing system of claim 5, wherein the DC voltage source is referenced to the first voltage.

7. The touch sensing system of claim 5, wherein the switch is configured to:
while the guard signal is in a first state, operate in a closed switch state, and
while the guard signal is in a second state, different that the first state, operate in an open switch state.

8. The touch sensing system of claim 7, wherein the first state is a low guard signal state, and the second state is a high guard signal state.

9. The touch sensing system of claim 7, wherein:
while the switch operates in the closed switch state, the DC voltage source charges the capacitor to the respective DC voltage between the first terminal of the capacitor and the second terminal of the capacitor.

10. The touch sensing system of claim 7, wherein the switch is configured to:
operate in the closed switch state in response to a control signal received by the switch, and
operate in the open switch state in response to the control signal received by the switch.

11. The touch sensing system of claim 7, wherein the switch is configured to:
autonomously operate in the closed switch state in response to the guard signal being in the first state, and
autonomously operate in the open switch state in response to the guard signal being in the second state.

12. The touch sensing system of claim 7, wherein the switch is included in the guard signal generation chip.

13. The touch sensing system of claim 12, wherein the DC voltage source is included in the guard signal generation chip.

14. The touch sensing system of claim 13, wherein the capacitor is not included in the guard signal generation chip or the touch sensing chip.

15. The touch sensing system of claim 13, wherein the capacitor is included in the touch sensing chip.

16. The touch sensing system of claim 1, further comprising a voltage regulator included in the touch sensing chip, wherein the voltage regulator regulates the high voltage received at the high voltage input node of the touch sensing chip for use by touch sensing circuitry included in the touch sensing chip.

17. The touch sensing system of claim 16, wherein the voltage regulator is referenced to the guard signal.

18. An electronic device comprising:
a touch sensor panel including one or more touch electrodes;
a guard signal generation chip operating in a first power domain referenced to a first voltage, the guard signal generation chip configured to generate a guard signal;
a touch sensing chip operating in a second power domain, different from the first power domain, referenced to the guard signal, the touch sensing chip configured to sense touch at the one or more touch electrodes included in the touch sensor panel operating in the second power domain referenced to the guard signal, and the touch sensing chip a different chip than the guard signal generation chip, wherein:

the touch sensing chip is configured to receive a low voltage at a low voltage input node of the touch sensing chip, and a high voltage at a high voltage input node of the touch sensing chip, the low voltage corresponds to the guard signal, and the high voltage is generated based on at least the guard signal and is referenced to the guard signal.

19. A method for operating a touch sensing system, the method comprising:

operating a guard signal generation chip in a first power domain referenced to a first voltage, the guard signal generation chip configured to generate a guard signal;

operating a touch sensing chip in a second power domain, different from the first power domain, referenced to the guard signal, the touch sensing chip configured to sense touch at one or more touch electrodes included in a touch sensor panel operating in the second power domain referenced to the guard signal, and the touch sensing chip a different chip than the guard signal generation chip, wherein:

the touch sensing chip is configured to receive a low voltage at a low voltage input node of the touch sensing chip, and a high voltage at a high voltage input node of the touch sensing chip, the low voltage corresponds to the guard signal, and the high voltage is generated based on at least the guard signal and is referenced to the guard signal.

* * * * *

UNITED STATES PATENT AND TRADEMARK OFFICE
CERTIFICATE OF CORRECTION

PATENT NO. : 10,459,587 B2
APPLICATION NO. : 16/179565
DATED : October 29, 2019
INVENTOR(S) : Christoph H. Krah et al.

Page 1 of 1

It is certified that error appears in the above-identified patent and that said Letters Patent is hereby corrected as shown below:

In the Claims

Column 28, Line 17, Claim 7, delete "that" and insert -- than --.

Signed and Sealed this
Seventh Day of April, 2020

Andrei Iancu
*Director of the United States Patent and Trademark Office*